(12) United States Patent
Li

(10) Patent No.: US 12,012,005 B1
(45) Date of Patent: Jun. 18, 2024

(54) HYBRID SYSTEM AND VEHICLE

(71) Applicant: Schaeffler Technologies AG & Co. KG, Herzogenaurach (DE)

(72) Inventor: Zhihao Li, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/278,848

(22) PCT Filed: Mar. 1, 2021

(86) PCT No.: PCT/CN2021/078495
§ 371 (c)(1),
(2) Date: Aug. 25, 2023

(87) PCT Pub. No.: WO2022/183328
PCT Pub. Date: Sep. 9, 2022

(51) Int. Cl.
*B60K 6/36* (2007.10)
*B60K 6/40* (2007.10)
*B60K 6/442* (2007.10)
*B60K 6/547* (2007.10)
*B60W 10/02* (2006.01)
*B60W 10/08* (2006.01)
*B60W 10/10* (2012.01)
*B60W 20/20* (2016.01)
*F16H 37/08* (2006.01)
*B60W 20/40* (2016.01)

(52) U.S. Cl.
CPC ............... *B60K 6/547* (2013.01); *B60K 6/36* (2013.01); *B60K 6/40* (2013.01); *B60K 6/442* (2013.01); *B60W 10/02* (2013.01); *B60W 10/08* (2013.01); *B60W 10/10* (2013.01); *B60W 20/20* (2013.01); *F16H 37/0806* (2013.01); *B60W 20/40* (2013.01); *B60Y 2200/92* (2013.01)

(58) Field of Classification Search
CPC . B60K 6/547; B60K 6/36; B60K 6/40; B60K 6/442; B60W 10/02; B60W 10/08; B60W 10/10; B60W 20/20; B60W 20/40; F16H 37/0806
USPC .............................. 475/5, 200; 74/330, 331
See application file for complete search history.

(56) References Cited

U.S. PATENT DOCUMENTS

| | | | |
|---|---|---|---|
| 2002/0040818 A1 | 4/2002 | Maruyama | |
| 2003/0045389 A1 | 3/2003 | Kima | |
| 2007/0051196 A1* | 3/2007 | Baldwin | F16H 61/0246 74/335 |
| 2015/0362025 A1* | 12/2015 | Schweiher | B60K 6/48 903/902 |
| 2023/0191897 A1* | 6/2023 | Rulfi Fertilio | B60K 6/448 475/5 |

FOREIGN PATENT DOCUMENTS

| | | |
|---|---|---|
| CN | 103029558 A | 4/2013 |
| CN | 104976329 A | 10/2015 |
| CN | 105402330 A | 3/2016 |

* cited by examiner

*Primary Examiner* — Roger L Pang

(57) ABSTRACT

A hybrid system and a vehicle, the hybrid system comprising an engine, an electric motor, a dual clutch, and a transmission provided with two synchromesh mechanisms and two input shafts. The engine being selectively in transmission connection to one of the input shafts via one clutch unit of the dual clutch and being selectively in transmission connection to the other of the input shafts via the other clutch unit of the dual clutch.

20 Claims, 21 Drawing Sheets

HYBRID SYSTEM AND VEHICLE

CROSS-REFERENCE TO RELATED APPLICATIONS

This application is the U.S. National Phase of PCT Appln. No. PCT/CN2021/078495 filed Mar. 1, 2021, the entire disclosure of which is incorporated by reference herein.

TECHNICAL FIELD

The present disclosure relates to the field of vehicles, and more particularly to a hybrid system and a vehicle comprising the hybrid system.

BACKGROUND

In the prior art, a strong hybrid system or plug-in hybrid system may comprise an electric motor and a so-called dedicated hybrid transmission, and such hybrid system has good flexibility and high modularity.

As an example of the above-mentioned hybrid system comprising an electric motor and a dedicated hybrid transmission, there is a hybrid system having the following structure, which comprises an engine, an electric motor, a transmission comprising five synchromesh mechanisms, a single clutch located between the engine and the electric motor and a dual clutch located between the electric motor and the transmission, wherein an output shaft of the engine is in transmission connection with an input/output shaft of the electric motor by means of the single clutch, and the input/output shaft of the electric motor is in transmission connection with an input shaft of the transmission by means of the dual clutch.

The hybrid system is complex in structural design since it has the single clutch and the dual clutch with two clutch units, and the five synchromesh mechanisms are arranged inside the transmission. This results in larger effort and higher cost to integrate components of the hybrid system together, and also in larger sizes of modules of the integrated hybrid system, thereby making the overall layout of a power system or vehicle containing the hybrid system larger.

As another example of the above-mentioned hybrid system comprising an electric motor and a dedicated hybrid transmission, there is also another hybrid system having the following structure, which comprises an engine, an electric motor, a transmission comprising four synchromesh mechanisms and a single clutch located between the engine and the transmission, wherein an output shaft of the engine is in transmission connection with a first input shaft of the transmission by means of the single clutch and an input/output shaft of the electric motor is in transmission connection with a second input shaft of the transmission by means of a gear transmission mechanism.

Although such hybrid system comprises only one clutch, the transmission has four synchromesh mechanisms arranged inside, and the transmission further comprises a gear reversing gear pair that functions in a pure engine driving mode. Therefore, such hybrid system also has a complex structural design.

SUMMARY

The present disclosure has been made in view of the deficiencies of the prior art as described above. The present disclosure, according to one exemplary embodiment, provides a hybrid system, which can realize the same or even more working modes compared with the hybrid system described in the background art above, and has a simpler structure, a more compact size and a lower cost. The present disclosure further provides a vehicle comprising the hybrid system.

The present disclosure provides a hybrid system as follows, comprising a transmission including a first input shaft, a second input shaft, an output shaft, and an intermediate shaft, wherein the second input shaft sleeves the first input shaft and the second input shaft and the first input shaft are capable of rotating independently of each other. The first input shaft is provided with a first synchromesh mechanism, and the output shaft is provided with a second synchromesh mechanism. A first input shaft first gear, which is arranged on the first input shaft in a non-torque-resistant manner and corresponds to the first synchromesh mechanism, is always in a meshing state with an intermediate shaft first gear, which is arranged on the intermediate shaft in a torque-resistant manner. A first input shaft second gear, which is arranged on the first input shaft in a non-torque-resistant manner and corresponds to the first synchromesh mechanism, is always in a meshing state with an output shaft first gear, which is arranged on the output shaft in a torque-resistant manner. An output shaft second gear and an output shaft third gear, which are arranged on the output shaft in a non-torque-resistant manner and correspond to the second synchromesh mechanism, are always in a meshing state, respectively with a second input shaft first gear and a second input shaft second gear, which are arranged on the second input shaft in a torque-resistant manner. The intermediate shaft is also provided with an intermediate shaft second gear in a torque-resistant manner, and the intermediate shaft second gear is always in a meshing state with the second input shaft second gear. The hybrid system further includes an electric motor, which is always in transmission connection with the second input shaft. The hybrid system further includes an engine and a dual clutch, wherein the dual clutch includes a first clutch unit and a second clutch unit. The engine is connected to the first input shaft and the second output shaft via the dual clutch, so that when the first clutch unit is engaged/disengaged, the engine and the first input shaft implement transmission connection/end transmission connection, and when the second clutch unit is engaged/disengaged, the engine and the second input shaft implement transmission connection/end transmission connection.

The dual clutch may be arranged on a radial inner side of a rotor of the electric motor.

The input/output shaft of the electric motor may be directly connected with the second input shaft in a coaxial manner; or the electric motor may always be in transmission connection with the second input shaft via the second input shaft first gear or the second input shaft second gear.

The input/output shaft of the electric motor may be directly connected with the intermediate shaft in a coaxial manner; or the electric motor may always be in transmission connection with the second input shaft via a gear pair consisting of the output shaft second gear and the second input shaft first gear or via a gear pair consisting of the output shaft third gear and the second input shaft second gear; or the electric motor may always be in transmission connection with the second input shaft via a gear pair consisting of an additional intermediate gear and the second input shaft first gear.

The hybrid system may further comprise a control module, the control module can control the hybrid system such that the hybrid system implements a pure electric motor driving mode, a pure engine driving mode, and/or a hybrid driving mode, wherein when the hybrid system is in the pure electric motor driving mode, the engine may be in a non-operating state, the electric motor may be in an operating state, the first clutch unit and the second clutch unit may both be disengaged, the first synchromesh mechanism may be in a neutral state, and the second synchromesh mechanism may be engaged with the output shaft second gear or the output shaft third gear, such that the electric motor transmits torque to the transmission for driving;

when the hybrid system is in the pure engine driving mode, the engine may be in an operating state, the electric motor may be in a non-operating state, the first clutch unit or the second clutch unit may be engaged, the first synchromesh mechanism may be engaged with the first input shaft first gear or the first input shaft second gear, and/or the second synchromesh mechanism may be engaged with the output shaft second gear or the output shaft third gear, such that the engine transmits torque to the transmission for driving;

when the hybrid system is in the hybrid driving mode, both the engine and the electric motor may be in an operating state, and the first clutch unit or the second clutch unit may be engaged, the first synchromesh mechanism is engaged with the first input shaft first gear or the first input shaft second gear, and/or the second synchromesh mechanism may be engaged with a corresponding gear of the output shaft second gear or the output shaft third gear, such that the engine and the electric motor transmit torque to the transmission for driving.

When the hybrid system is in the pure engine driving mode, the first clutch unit may be engaged and the second clutch unit is disengaged, the first synchromesh mechanism may be engaged with the first input shaft first gear, and the second synchromesh mechanism may be engaged with the output shaft second gear or the output shaft third gear; or the first clutch unit may be engaged and the second clutch unit may be disengaged, the first synchromesh mechanism may be engaged with the first input shaft second gear, and the second synchromesh mechanism may be in a neutral state; or the first clutch unit may be disengaged and the second clutch unit may be engaged, the first synchromesh mechanism may be in a neutral state, and the second synchromesh mechanism may be engaged with the output shaft second gear or the output shaft third gear.

When the hybrid system is in the hybrid driving mode, the first clutch unit may be engaged and the second clutch unit may be disengaged, the first synchromesh mechanism may be engaged with the first input shaft first gear or the first input shaft second gear, and the second synchromesh mechanism may be engaged with the output shaft second gear or the output shaft third gear; or the first clutch unit may be disengaged and the second clutch unit may be engaged, the first synchromesh mechanism may be in a neutral state, and the second synchromesh mechanism may be engaged with the output shaft second gear or the output shaft third gear.

The control module can control the hybrid system such that the hybrid system implements an idle charge mode, when the hybrid system is in the idle charge mode, the engine and the electric motor may both be in an operating state, the first clutch unit may be disengaged and the second clutch unit may be engaged, and both the first synchromesh mechanism and the second synchromesh mechanism may be in a neutral state, such that the engine transmits torque to the electric motor to enable the electric motor to charge a battery.

The control module can control the hybrid system such that the hybrid system implements a mode of starting the engine while driving, when the hybrid system is in the mode of starting the engine while driving, the electric motor may be in an operating state, the first clutch unit may be disengaged and the second clutch unit may be engaged, the first synchromesh mechanism may be in a neutral state, and the second synchromesh mechanism may be engaged with the output shaft second gear or the output shaft third gear, such that the electric motor transmits torque to the transmission while transmitting torque to the engine for starting the engine.

The present disclosure provides a vehicle as follows, the vehicle comprises the hybrid system according to any one of the above technical solutions.

By the adoption of the technical solutions described above, the present disclosure provides a hybrid system and a vehicle. The hybrid system comprises an engine, an electric motor, a dual clutch, and a transmission having two synchromesh mechanisms. The hybrid system can, through a reasonable structural design, implement the same or even more working modes as the hybrid system adopting an electric motor and a dedicated hybrid transmission in the background art, and the hybrid system has a simpler structure, a more compact size and a lower cost.

DETAILED DESCRIPTION

Embodiments of the present disclosure will be described below with reference to the drawings of the specification. In the present disclosure, the "transmission connection" refers to a connection between two components capable of transmitting a driving force/torque, and unless otherwise specified, means a direct connection or an indirect connection between the two components.

Figure 1:
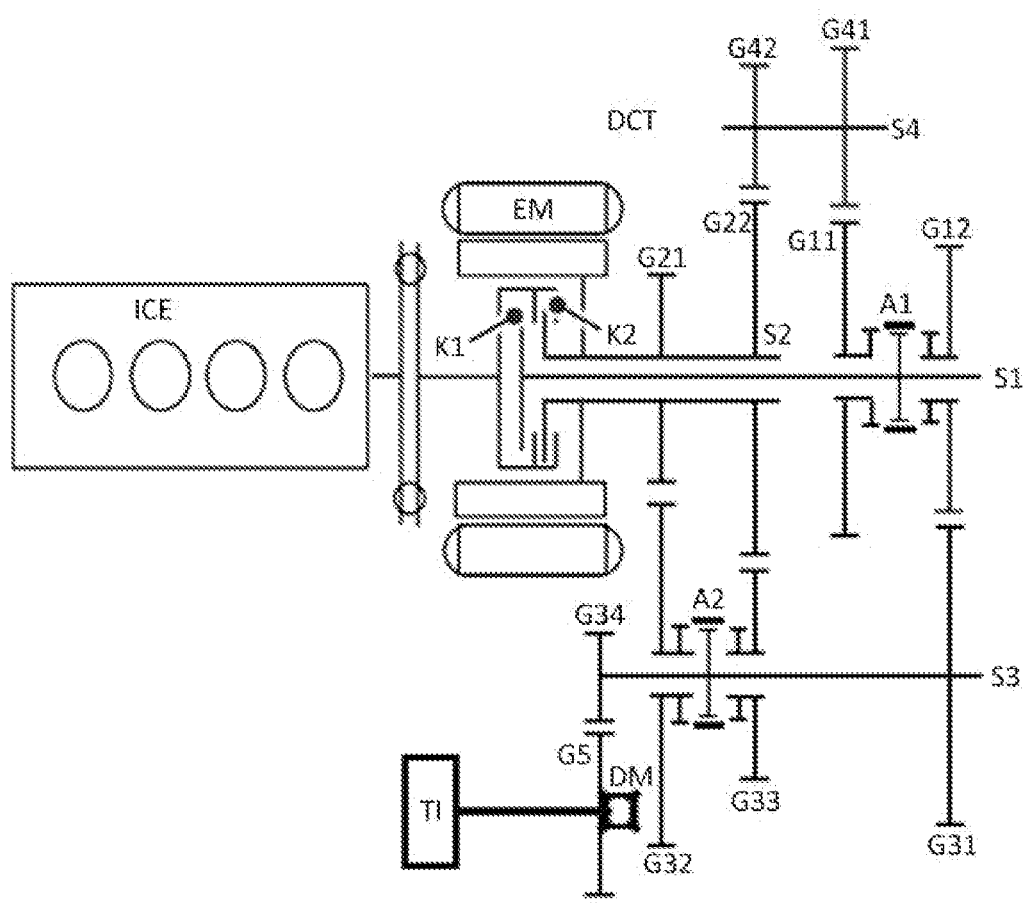
FIG. 1 shows a schematic diagram of a connection structure of a hybrid system according to an exemplary embodiment of the present disclosure.

As shown in FIG. 1, the hybrid system according to an exemplary embodiment of the present disclosure comprises an engine ICE, a dual clutch (comprising a first clutch unit K1 and a second clutch unit K2), an electric motor EM, a transmission DCT, a differential mechanism DM, and a battery (not shown).

Specifically, in this embodiment, the engine ICE is, for example, a four-cylinder engine. An output shaft of the engine ICE is connected to a first input shaft S1 and a second input shaft S2 of the transmission DCT via the dual clutch. When the first clutch unit K1 of the dual clutch is engaged/disengaged, the output shaft of the engine ICE and the first input shaft S1 of the transmission DCT implement transmission connection/end transmission connection; when the second clutch unit K2 of the dual clutch is engaged/disengaged, the output shaft of the engine ICE and the second input shaft S2 of the transmission DCT implement transmission connection/end transmission connection. It should be understood that, in order to reduce the influence of torsional vibration of the engine ICE, a vibration damping mechanism, for example a dual mass flywheel or the like may be arranged between the engine ICE and the dual clutch.

In this embodiment, the dual clutch (the first clutch unit K1 and the second clutch unit K2) is, for example, a conventional friction clutch, and the structure of the dual clutch will not be described in detail herein. In addition, in this embodiment, the dual clutch may be integrated to a radial inner side of a rotor of the electric motor EM, such that an axial dimension of the entire hybrid system can be reduced.

In this embodiment, an input/output shaft (rotor) of the electric motor EM is directly connected with the second input shaft S2 of the transmission DCT in a coaxial manner, such that the driving force/torque can be bidirectionally transmitted between the electric motor EM and the transmission DCT. The " . . . directly connected with . . . in a coaxial manner" described above includes that the input/output shaft of the electric motor EM and the second input shaft S2 of the transmission DCT are the same shaft, the input/output shaft (rotor) of the electric motor EM and the second input shaft S2 of the transmission DCT are torsionally or rigidly connected in a coaxial manner, and the rotor of the electric motor EM is torsionally connected with the second input shaft S2 via, for example, a rotor bracket, a spline structure, etc. In the case where the electric motor EM is supplied with electric power from the battery (not shown), the electric motor EM transmits driving force/torque to the second input shaft S2 of the transmission DCT as a motor; and in the case where the electric motor EM obtains driving force/torque from the second input shaft S2, the electric motor EM charges the battery as a generator.

In this embodiment, the battery (not shown) is electrically connected to the electric motor EM, such that the battery can supply the electrical energy to the electric motor EM and can charge the battery via the electric motor EM.

In this embodiment, as shown in FIG. 1, the transmission DCT comprises the first input shaft S1, the second input shaft S2, an output shaft S3 and an intermediate shaft S4. The first input shaft S1 is a solid shaft, the second input shaft S2 is a hollow shaft, and the first input shaft S1 penetrates through the interior of the second input shaft S2, that is, the second input shaft S2 sleeves the first input shaft S1, and a central axis of the first input shaft S1 coincides with that of the second input shaft S2. The first input shaft S1 and the second input shaft S2 can rotate independently of each other. The output shaft S3 is disposed in parallel with and spaced from the first input shaft S1 and the second input shaft S2, and the intermediate shaft S4 is disposed in parallel with and spaced from the first input shaft S1 and the second input shaft S2.

In addition, the transmission DCT further comprises a plurality of gears G11, G12, G21, G22, G31, G32, G33, G34, G41, G42, G5 arranged on each shaft, and synchromesh mechanisms A1, A2. The first synchromesh mechanism A1 is arranged on the first input shaft S1, and the second synchromesh mechanism A2 is arranged on the output shaft S3. Each of the synchromesh mechanisms A1 and A2 comprises a synchronizer and a gear actuator and corresponds to two gears respectively, wherein the first synchromesh mechanism A1 corresponds to the gears G11 and G12, and the second synchromesh mechanism A2 corresponds to the gears G32 and G33.

Hereinafter, the gear pairs constituted by the gears of each shaft of the transmission DCT will be described.

The gear G11 is arranged on the first input shaft S1 in a non-torque-resistant manner, so that the gear G11 can rotate freely relative to the first input shaft S1; and the gear G41 is arranged on the intermediate shaft S4 in a torque-resistant manner, so that the gear G41 can always rotate along with the intermediate shaft S4, and the gear G11 and the gear G41 are always in a meshing state to form a gear pair.

The gear G12 is spaced apart from the gear G11 and is arranged on the first input shaft S1 in a non-torque-resistant manner, so that the gear G12 can freely rotate relative to the first input shaft S1; and the gear G31 is arranged on the output shaft S3 in a torque-resistant manner, so that the gear G31 can always rotate along with the output shaft S3, and the gear G12 and the gear G31 are always in a meshing state to form a gear pair.

The gear G21 is arranged on the second input shaft S2 in a torque-resistant manner, so that the gear G21 can always rotate along with the second input shaft S2; and the gear G32 is spaced apart from the gear G31 and is arranged on the output shaft S3 in a non-torque-resistant manner, so that the gear G32 can rotate freely relative to the output shaft S3, and the gear G21 and the gear G32 are always in a meshing state to form a gear pair.

The gear G22 is arranged on the second input shaft S2 in a torque-resistant manner, so that the gear G22 can always rotate along with the second input shaft S2, and the gear G33 is spaced apart from the gear G32 and is arranged on the output shaft S3 in a non-torque-resistant manner, so that the gear G33 can rotate freely relative to the output shaft S3, and the gear G22 and the gear G33 are always in a meshing state to form a gear pair.

In addition, the gear G42 is spaced apart from the gear G41 and is arranged on the intermediate shaft S4 in a torque-resistant manner, so that the gear G42 can always rotate along with the intermediate shaft S4, and the gear G22 and the gear G42 are also in a meshing state to form a gear pair.

In this way, by adopting the structure described above, the plurality of gears of the transmission DCT mesh with one another to constitute a plurality of gear pairs corresponding to a plurality of gears of the transmission DCT respectively, and the synchromesh mechanisms A1 and A2 can be engaged with or disengaged from the corresponding gears to achieve gear shifting. When gear shifting by the transmission DCT is needed, synchronizers of the corresponding synchromesh mechanisms A1 and A2 act to be engaged with the corresponding gears to implement selective transmission connection or end transmission connection among the shafts.

In this embodiment, the gear G5, as a differential input gear of a differential mechanism DM is always in a meshing state with the gear G34, which is arranged on the output shaft S3 in a torque-resistant manner, of the transmission DCT, such that the differential mechanism DM is always in transmission connection with the output shaft S3 of the transmission DCT. In this embodiment, the differential mechanism DM is not included in the transmission DCT, but can also be integrated into the transmission DCT as needed.

In this way, the driving force/torque from the engine ICE and the electric motor EM can be transmitted to the differential mechanism DM via the transmission DCT so as to be further output to wheels TI of a vehicle.

The specific structure of the hybrid system according to an exemplary embodiment of the present disclosure is described in detail above, and working modes and transmission paths of torque of the hybrid system will be described below.

The hybrid system according to an exemplary embodiment of the present disclosure illustrated in FIG. 1 has a plurality of working modes, including but not limited to a pure electric motor driving mode, a pure engine driving mode, a hybrid driving mode, an idle charge mode, and a mode of starting the engine while driving (a working mode in which the engine is started while the vehicle is purely driven by the electric motor to run).

The working states of the electric motor EM, the engine ICE, the first clutch unit K1, the second clutch unit K2, the first synchromesh mechanism A1 and the second synchromesh mechanism A2 in the above-mentioned exemplary working modes are show in in Table 1 below.

TABLE 1

| Mode | EM | ICE | K1 | K2 | A1 L | A1 N | A1 R | A2 L | A2 N | A2 R |
|---|---|---|---|---|---|---|---|---|---|---|
| EM1 | ■ | | | | | ■ | | ■ | | |
| EM2 | ■ | | | | | ■ | | | | ■ |
| ICE1 | | ■ | ■ | | ■ | | | | ■ | |
| ICE2 | | ■ | | ■ | ■ | | | | ■ | |
| ICE3 | | ■ | | ■ | | | | | ■ | |
| ICE4 | | ■ | ■ | | | | | | | ■ |
| ICE5 | | ■ | | ■ | | | | | | ■ |
| Hybrid1 | ■ | ■ | ■ | | ■ | | | ■ | | |
| Hybrid2 | ■ | ■ | | ■ | ■ | | | ■ | | |
| Hybrid3 | ■ | ■ | | ■ | | | | | ■ | |
| Hybrid4 | ■ | ■ | ■ | | | | | | | ■ |
| Hybrid5 | ■ | ■ | | ■ | ■ | | | | | ■ |
| Hybrid6 | ■ | ■ | | ■ | | | | | | ■ |
| SC | ■ | ■ | | ■ | ■ | | | | ■ | |
| ICE start1 | ■ | ■ | | ■ | ■ | | | ■ | | |
| ICE start2 | ■ | ■ | | ■ | ■ | | | | | ■ |

The following explanation is provided for the contents in Table 1 above.

1. About the modes in Table 1:
EM1 to EM2 represent two pure electric motor driving modes which can also be used in the case of gear reversing;
ICE1 to ICE5 represent five pure engine driving modes;
Hybrid1 to Hybrid6 represent six hybrid driving modes, wherein Hybrid1 is equivalent to EM1+ICE1, Hybrid2 is equivalent to EM1+ICE2, Hybrid3 is equivalent to EM1+ICE3,
Hybrid4 is equivalent to EM2+ICE3, Hybrid5 is equivalent to EM2+ICE4, and Hybrid6 is equivalent to EM2+ICE5;
SC represents the idle charge mode; and
ICE start1 and ICE start2 represent two modes of starting the engine while driving.

The EM, ICE, K1, K2, A1 and A2 in the first line of Table 1 respectively correspond to the reference numerals in FIG. 1, i.e., they respectively represent the electric motor, the engine, the first clutch unit, the second clutch unit, the first synchromesh mechanism and the second synchromesh mechanism in the hybrid system in FIG. 1.

About the symbol "■":
for the columns of Table 1 where EM and ICE are located, the presence of this symbol represents that the electric motor EM and the engine ICE are in an operating state, and the absence of this symbol represents that the electric motor EM and the engine ICE are in a non-operating state;
for the columns of Table 1 where K1 and K2 are located, the presence of this symbol represents that the first clutch unit K1 and the second clutch unit K2 are engaged, and the absence of this symbol represents that the first clutch unit K1 and the second clutch unit K2 are disengaged; for the columns of Table 1 where A1 and A2 are located, the presence of this symbol represents that the first synchromesh mechanism A1 and the second synchromesh mechanism A2 are in the corresponding "L", "N" and "R" states.

About the symbols "L", "N" and "R" corresponding to A1 and A2:
for the first synchromesh mechanism A1, "L" represents the state of the first synchromesh mechanism A1 being engaged with the gear G11, and for the second synchromesh mechanism A2, "L" represents the state of the second synchromesh mechanism A2 being engaged with the gear G32;

for the first synchromesh mechanism A1, "N" represents the neutral state of the first synchromesh mechanism A1 being disengaged from both the gear G11 and the gear G12, and for the second synchromesh mechanism A2, "N" represents the neutral state of the second synchromesh mechanism A2 being disengaged from both the gear G32 and the gear G33;

for the first synchromesh mechanism A1, "R" represents the state of the first synchromesh mechanism A1 being engaged with the gear G12, and for the second synchromesh mechanism A2, "R" represents the state of the second synchromesh mechanism A2 being engaged with the gear G33;

In conjunction with Table 1 and FIG. 2a to FIG. 6b above, the working modes of the hybrid system in FIG. 1 are described in more details.

As shown in Table 1, a control module (not shown) of the hybrid system can control the hybrid system such that the hybrid system implements two pure electric motor driving modes EM1 to EM2.

When the hybrid system is in the first pure electric motor driving mode EM1, the electric motor EM is in the operating state; the engine ICE is in the non-operating state; the first clutch unit K1 and the second clutch unit K2 are both disengaged; in the transmission DCT, the first synchromesh mechanism A1 is in the neutral state, and the second synchromesh mechanism A2 is engaged with the gear G32.

Figure 2A:
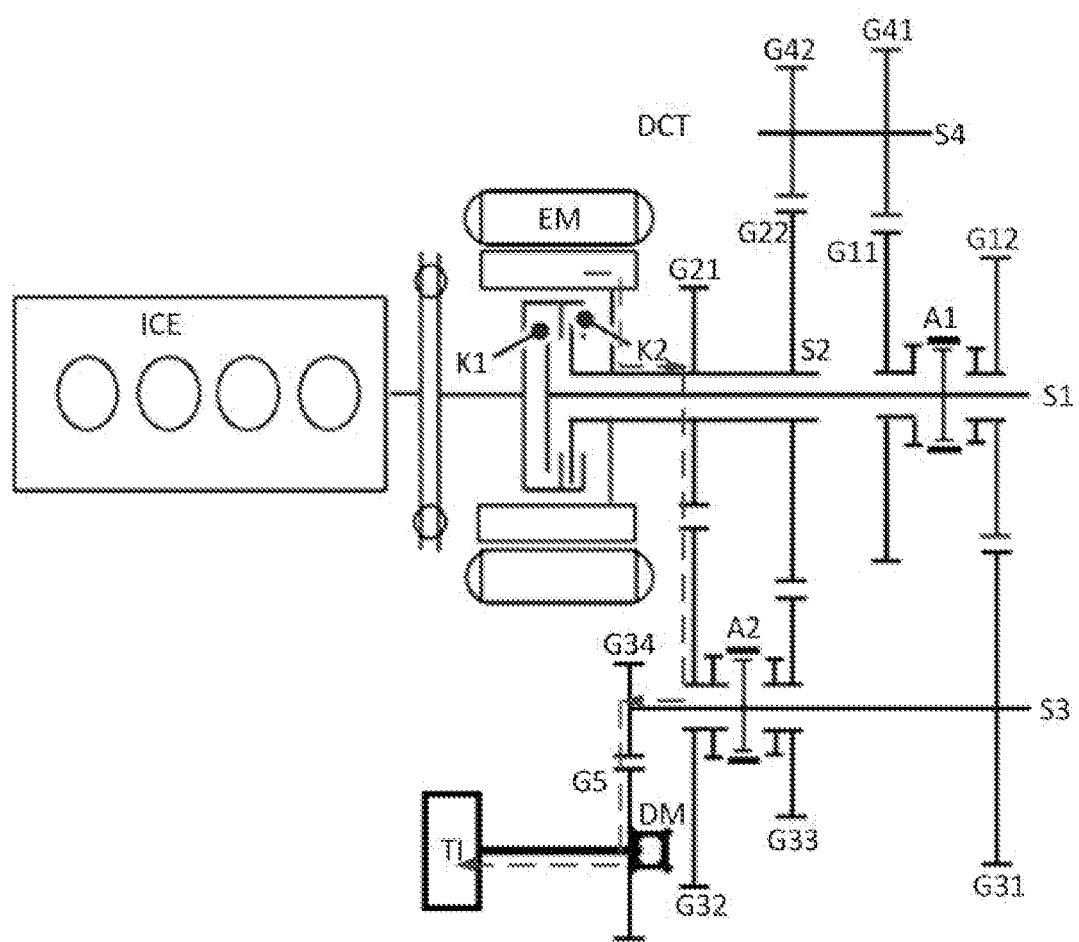
FIG. 2a is an illustrative diagram for illustrating a transmission path of torque of an electric motor in a transmission when the hybrid system in FIG. 1 is in a first pure electric motor driving mode.

Thus, as shown in FIG. 2a via a broken line, the electric motor EM transmits torque to the differential mechanism DM for driving via the second input shaft S2→the gear G21→the gear G32→the output shaft S3→the gear G34→the gear G5.

When the hybrid system is in the second pure electric motor driving mode EM2, the electric motor EM is in the operating state; the engine ICE is in the non-operating state; the first clutch unit K1 and the second clutch unit K2 are both disengaged; in the transmission DCT, the first synchromesh mechanism A1 is in the neutral state, and the second synchromesh mechanism A2 is engaged with the gear G33.

Figure 2B:
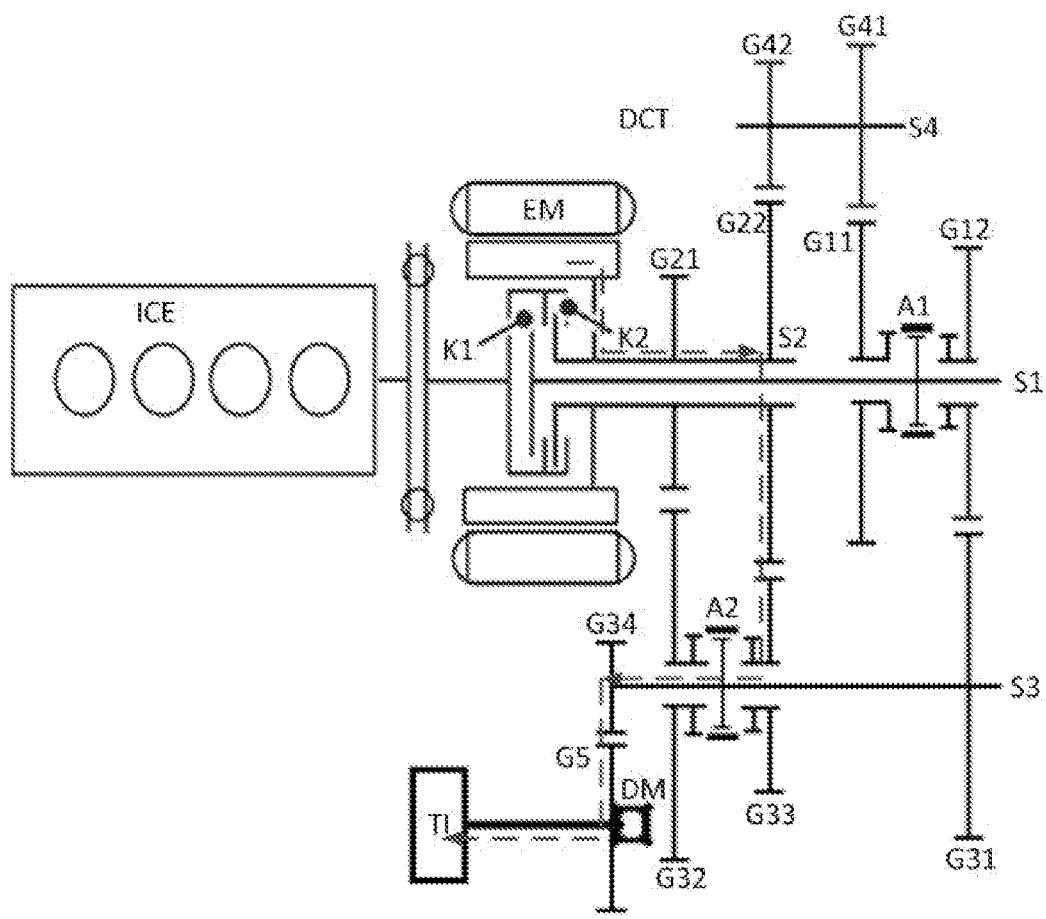
FIG. 2b is an illustrative diagram for illustrating a transmission path of torque of the electric motor in the transmission when the hybrid system in FIG. 1 is in a second pure electric motor driving mode.

Thus, as shown in FIG. 2b via a broken line, the electric motor EM transmits torque to the differential mechanism DM for driving via the second input shaft S2→the gear G22→the gear G33→the output shaft S3→the gear G34→the gear G5.

Further, as shown in Table 1, the control module of the hybrid system can control the hybrid system such that the hybrid system implements five pure engine driving modes ICE1 to ICE5.

When the hybrid system is in the first pure engine driving mode ICE1, the electric motor EM is in the non-operating state; the engine ICE is in the operating state; the first clutch unit K1 is engaged, and the second clutch unit K2 is disengaged; in the transmission DCT, the first synchromesh mechanism A1 is engaged with the gear G11, and the second synchromesh mechanism A2 is engaged with the gear G32.

Figure 3A:
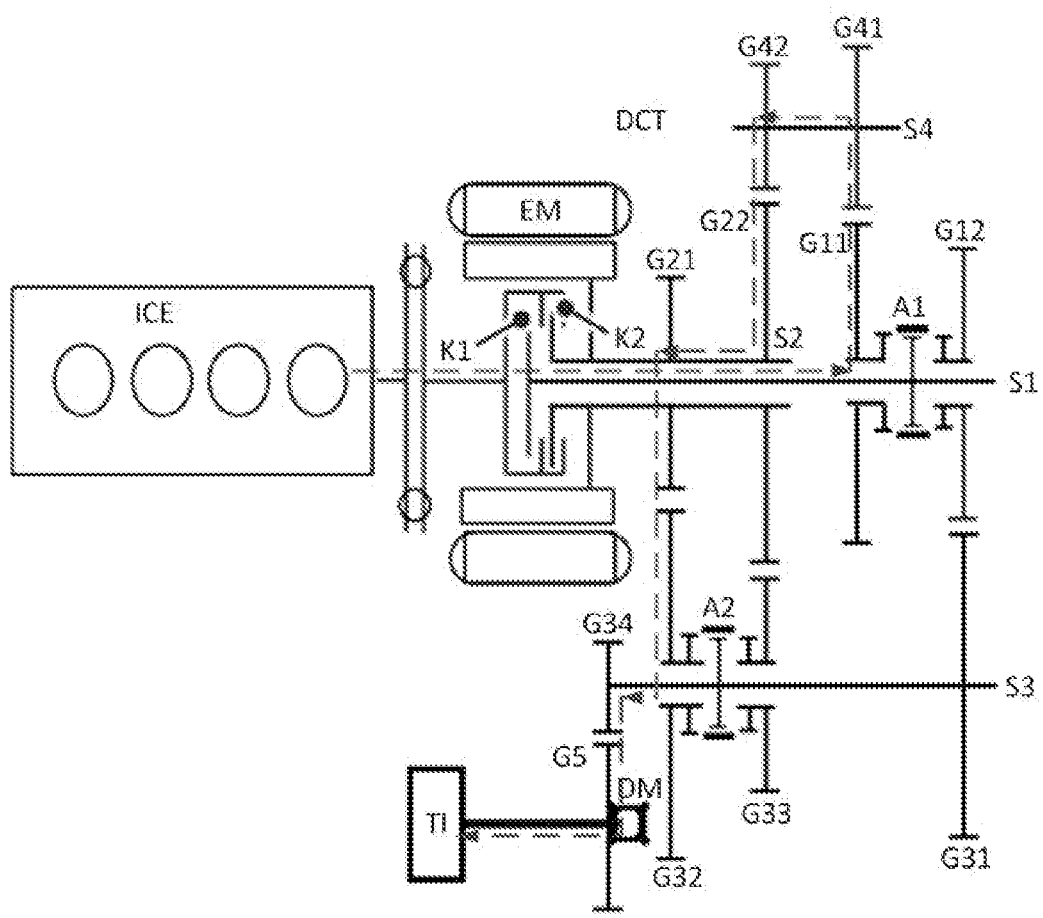
FIG. 3a is an illustrative diagram for illustrating a transmission path of torque of an engine in the transmission when the hybrid system in FIG. 1 is in a first pure engine driving mode.

Thus, as shown in FIG. 3a via a broken line, the engine ICE transmits torque to the differential mechanism DM for driving via the first input shaft S1→the gear G11→the gear G41→the intermediate shaft S4→the gear G42→the gear G22→the second input shaft S2→the gear G21→the gear G32→the output shaft S3→the gear G34→the gear G5.

When the hybrid system is in the second pure engine driving mode ICE2, the electric motor EM is in the non-operating state; the engine ICE is in the operating state; the first clutch unit K1 is disengaged, and the second clutch unit K2 is engaged; in the transmission DCT, the first synchromesh mechanism A1 is in the neutral state, and the second synchromesh mechanism A2 is engaged with the gear G32.

Figure 3B:
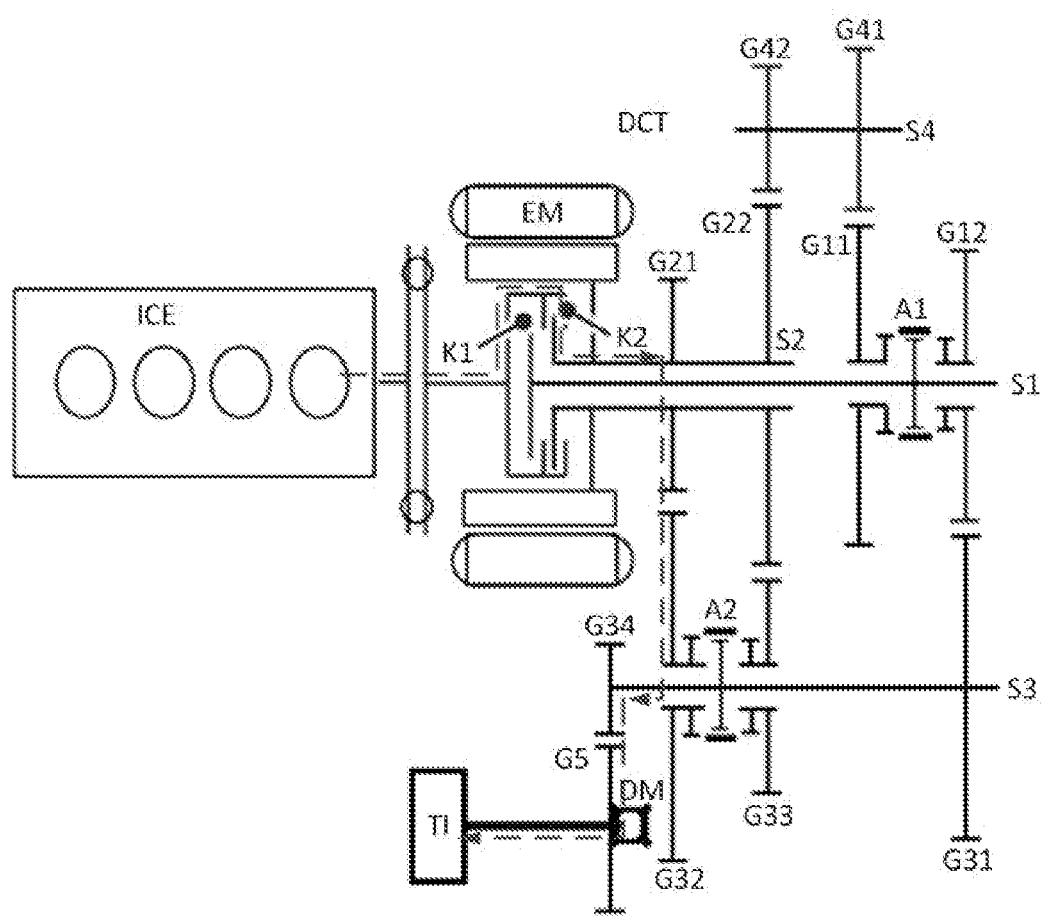
FIG. 3b is an illustrative diagram for illustrating a transmission path of torque of the engine in the transmission when the hybrid system in FIG. 1 is in a second pure engine driving mode.

Thus, as shown in FIG. 3b via a broken line, the engine ICE transmits torque to the differential mechanism DM for driving via the second input shaft S2→the gear G21→the gear G32→the output shaft S3→the gear G34→the gear G5.

When the hybrid system is in the third pure engine driving mode ICE3, the electric motor EM is in the non-operating state; the engine ICE is in the operating state; the first clutch unit K1 is engaged, and the second clutch unit K2 is disengaged; in the transmission DCT, the first synchromesh mechanism A1 is engaged with the gear G12, and the second synchromesh mechanism A2 is in the neutral state.

Figure 3C:
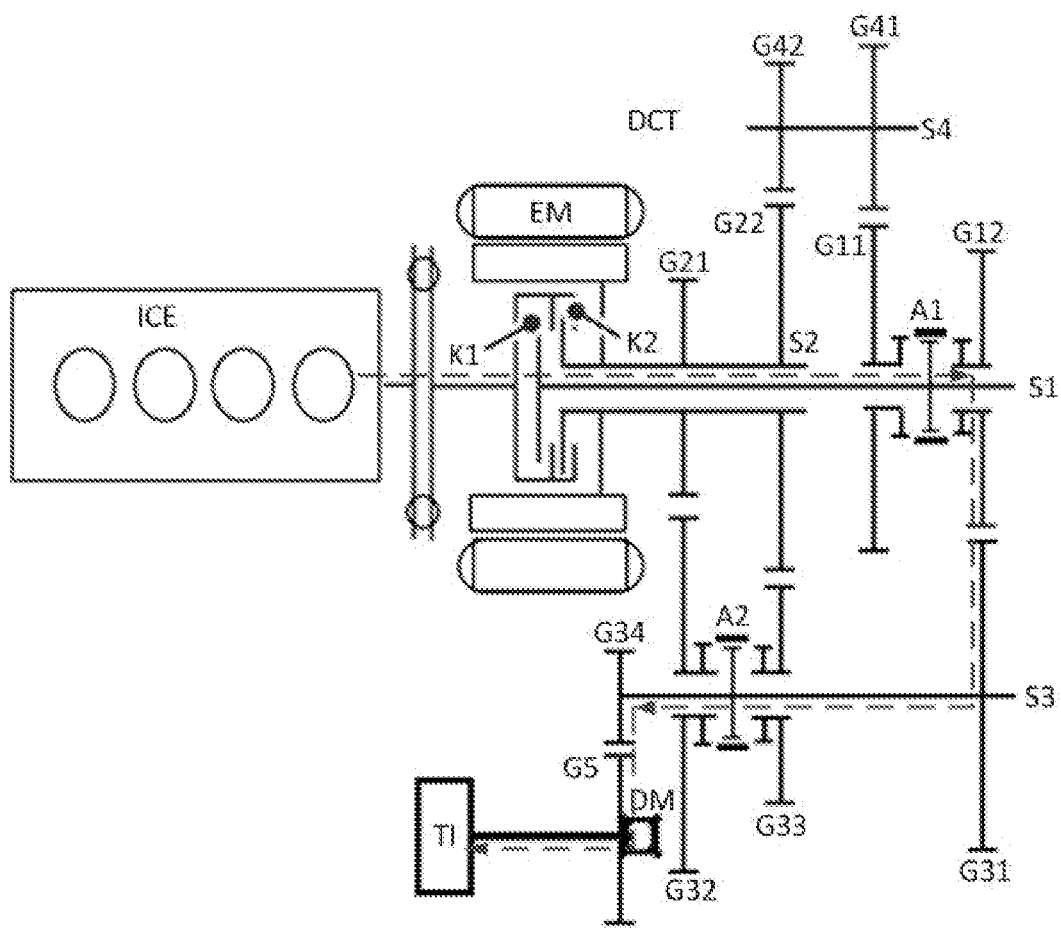
FIG. 3c is an illustrative diagram for illustrating a transmission path of torque of the engine in the transmission when the hybrid system in FIG. 1 is in a third pure engine driving mode.

Thus, as shown in FIG. 3c via a broken line, the engine ICE transmits torque to the differential mechanism DM for driving via the first input shaft S1→the gear G12→the gear G31→the output shaft S3→the gear G34→the gear G5.

When the hybrid system is in the fourth pure engine driving mode ICE4, the electric motor EM is in the non-operating state; the engine ICE is in the operating state; the first clutch unit K1 is engaged, and the second clutch unit K2 is disengaged; in the transmission DCT, the first synchromesh mechanism A1 is engaged with the gear G11, and the second synchromesh mechanism A2 is engaged with the gear G33.

Figure 3D:
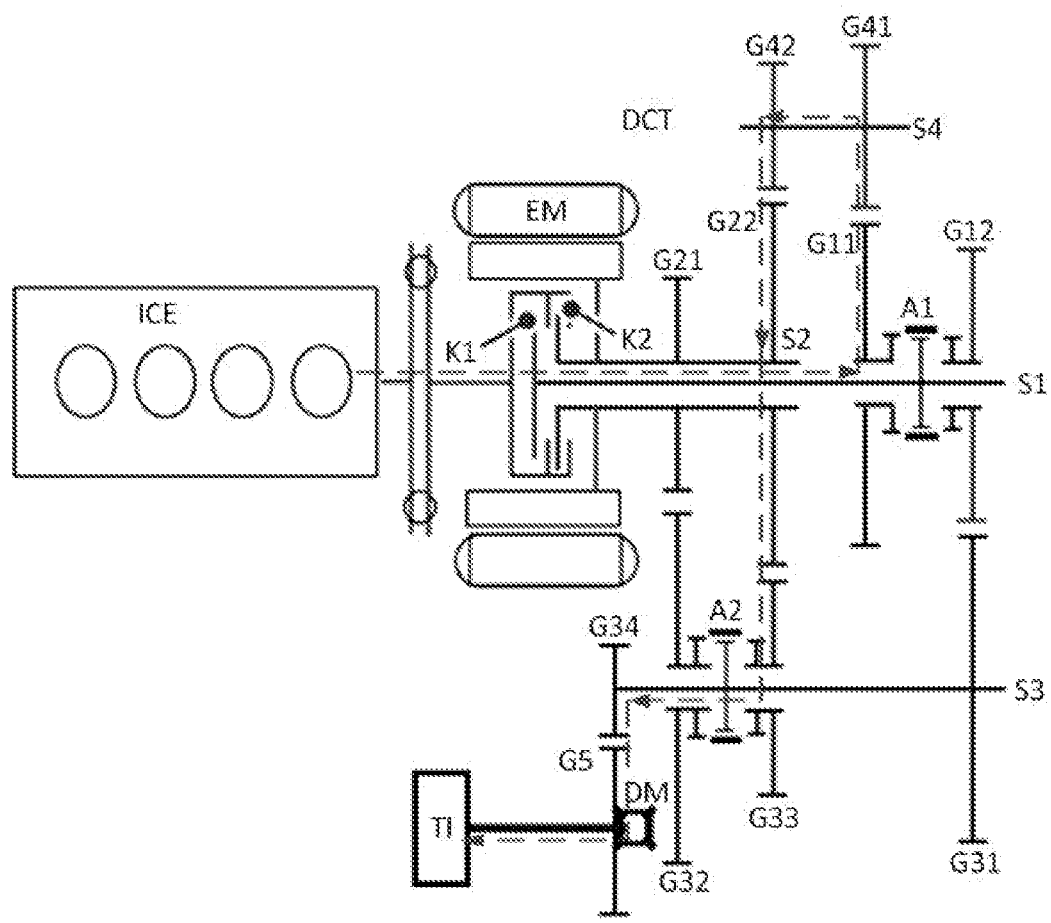
FIG. 3d is an illustrative diagram for illustrating a transmission path of torque of the engine in the transmission when the hybrid system in FIG. 1 is in a fourth pure engine driving mode.

Thus, as shown in FIG. 3d via a broken line, the engine ICE transmits torque to the differential mechanism DM for driving via the first input shaft S1→the gear G11→the gear G41→the intermediate shaft S4→the gear G42→the gear G22→the gear G33→the output shaft S3→the gear G34→the gear G5.

When the hybrid system is in the fifth pure engine driving mode ICE5, the electric motor EM is in the non-operating state; the engine ICE is in the operating state; the first clutch unit K1 is disengaged, and the second clutch unit K2 is engaged; in the transmission DCT, the first synchromesh mechanism A1 is in the neutral state, and the second synchromesh mechanism A2 is engaged with the gear G33.

Figure 3E:
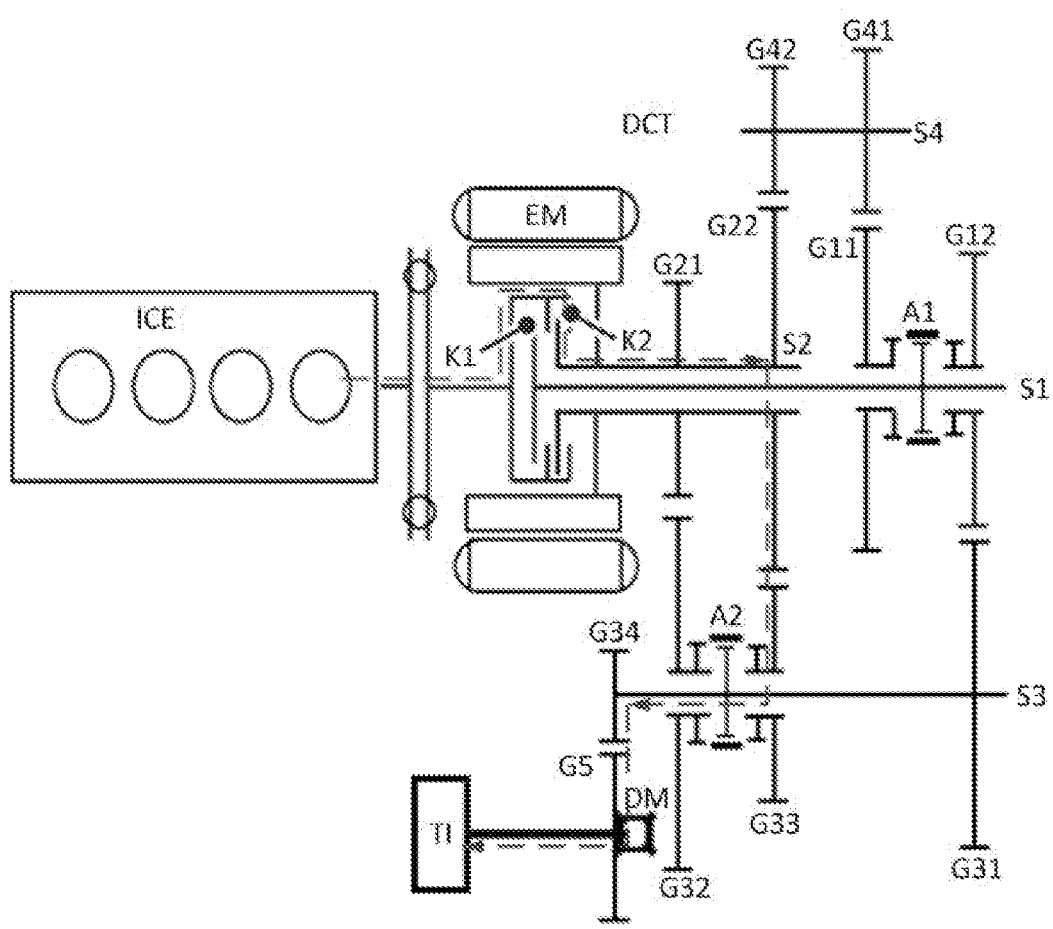
FIG. 3e is an illustrative diagram for illustrating a transmission path of torque of the engine in the transmission when the hybrid system in FIG. 1 is in a fifth pure engine driving mode.

Thus, as shown in FIG. 3e via a broken line, the engine ICE transmits torque to the differential mechanism DM for driving via the second input shaft S2→the gear G22→the gear G33→the output shaft S3→the gear G34→the gear G5.

Further, as shown in Table 1, the control module of the hybrid system can control the hybrid system such that the hybrid system implements six hybrid driving modes Hybrid1 to Hybrid6.

When the hybrid system is in the first hybrid driving mode Hybrid1, the electric motor EM and the engine ICE are both in the operating state; the first clutch unit K1 is engaged, and the second clutch unit K2 is disengaged; in the transmission DCT, the first synchromesh mechanism A1 is engaged with the gear G11, and the second synchromesh mechanism A2 is engaged with the gear G32.

Figure 4A:
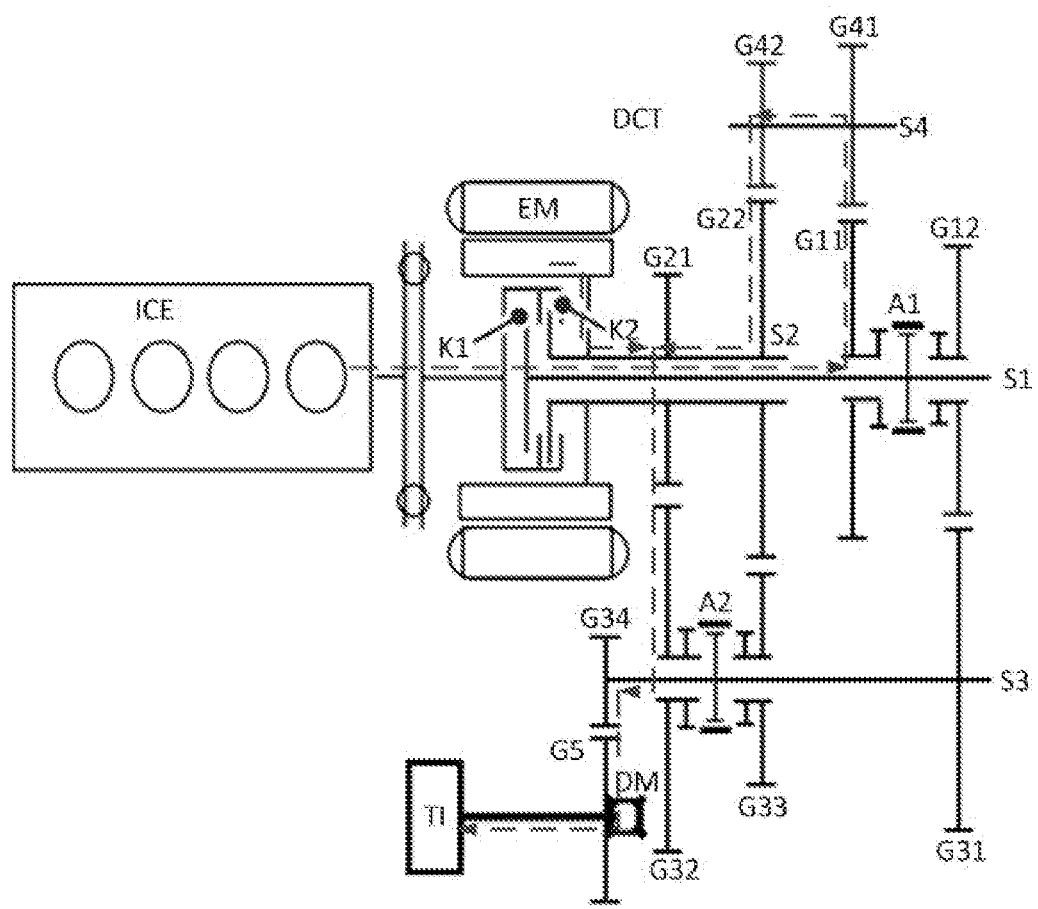
FIG. 4a is an illustrative diagram for illustrating a transmission path of torque of the engine and the electric motor in the transmission when the hybrid system in FIG. 1 is in a first hybrid driving mode.

Thus, as shown in FIG. 4a via broken lines, the electric motor EM transmits torque to the differential mechanism DM for driving via the second input shaft S2→the gear G21→the gear G32→the output shaft S3→the gear G34→the gear G5, and the engine ICE transmits torque to the differential mechanism DM for driving via the first input shaft S1→the gear G11→the gear G41→the intermediate shaft S4→the gear G42→the gear G22→the second input shaft S2→the gear G21→the gear G32→the output shaft S3→the gear G34→the gear G5.

When the hybrid system is in the second hybrid driving mode Hybrid2, the electric motor EM and the engine ICE are both in the operating state; the first clutch unit K1 is disengaged, and the second clutch unit K2 is engaged; in the transmission DCT, the first synchromesh mechanism A1 is in the neutral state, and the second synchromesh mechanism A2 is engaged with the gear G32.

Figure 4B:
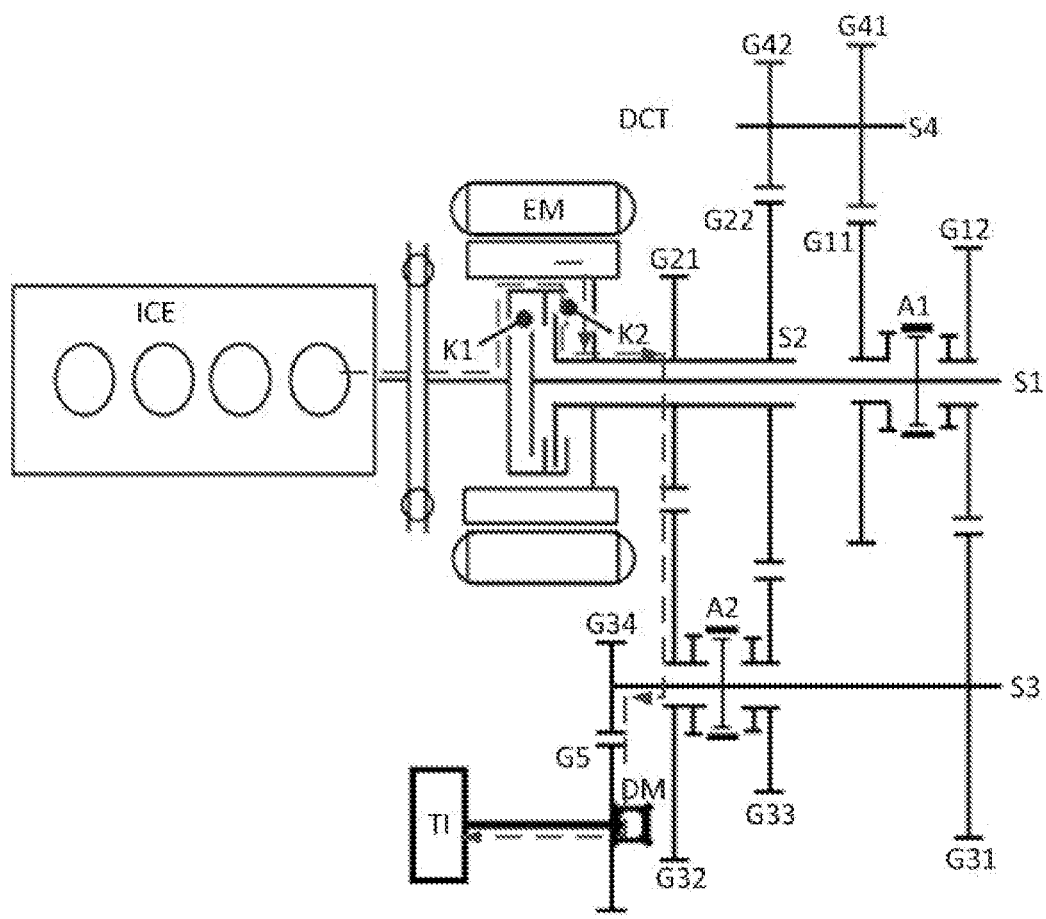
FIG. 4b is an illustrative diagram for illustrating a transmission path of torque of the engine and the electric motor in the transmission when the hybrid system in FIG. 1 is in a second hybrid driving mode.

Thus, as shown in FIG. 4b via broken lines, the electric motor EM transmits torque to the differential mechanism DM for driving via the second input shaft S2→the gear G21→the gear G32→the output shaft S3→the gear G34→the gear G5, and the engine ICE transmits torque to the differential mechanism DM for driving via the second input shaft S2→the gear G21→the gear G32→the output shaft S3→the gear G34→the gear G5.

When the hybrid system is in the third hybrid driving mode Hybrid3, the electric motor EM and the engine ICE are both in the operating state; the first clutch unit K1 is engaged, and the second clutch unit K2 is disengaged; in the transmission DCT, the first synchromesh mechanism A1 is engaged with the gear G12, and the second synchromesh mechanism A2 is engaged with the gear G32.

Figure 4C:
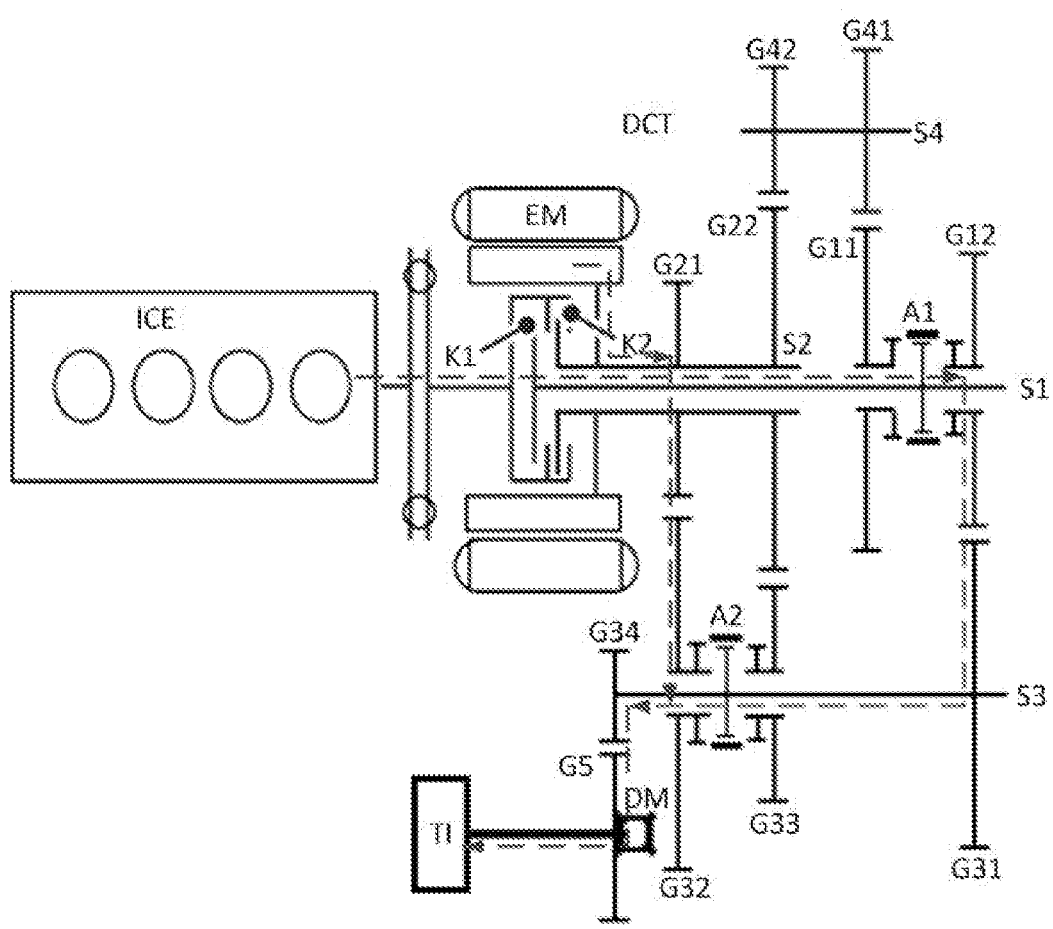
FIG. 4c is an illustrative diagram for illustrating a transmission path of torque of the engine and the electric motor in the transmission when the hybrid system in FIG. 1 is in a third hybrid driving mode.

Thus, as shown in FIG. 4c via broken lines, the electric motor EM transmits torque to the differential mechanism DM for driving via the second input shaft S2→the gear G21→the gear G32→the output shaft S3→the gear G34→the gear G5, and the engine ICE transmits torque to the differential mechanism DM for driving via the first input shaft S1→the gear G12→the gear G31→the output shaft S3→the gear G34→the gear G5.

When the hybrid system is in the fourth hybrid driving mode Hybrid4, the electric motor EM and the engine ICE are both in the operating state; the first clutch unit K1 is engaged, and the second clutch unit K2 is disengaged; in the transmission DCT, the first synchromesh mechanism A1 is engaged with the gear G12, and the second synchromesh mechanism A2 is engaged with the gear G33.

Figure 4D:
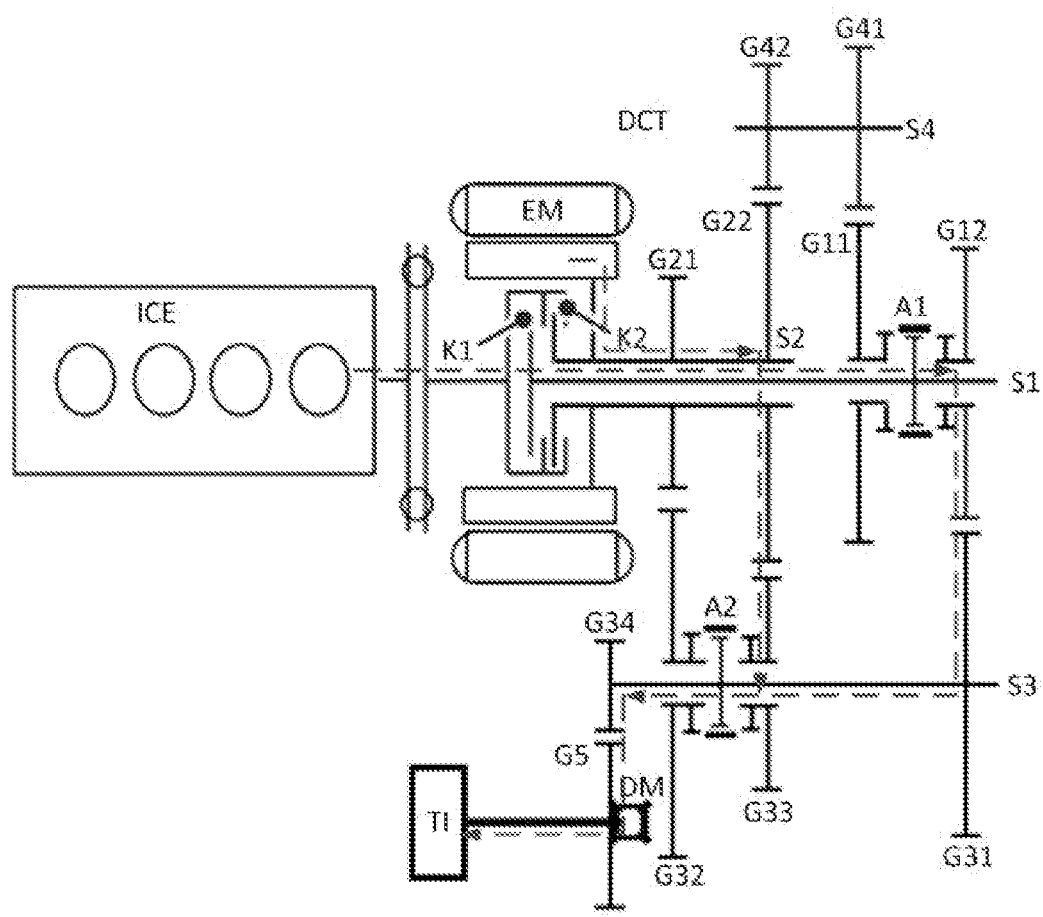
FIG. 4d is an illustrative diagram for illustrating a transmission path of torque of the engine and the electric motor in the transmission when the hybrid system in FIG. 1 is in a fourth hybrid driving mode.

Thus, as shown in FIG. 4d via broken lines, the electric motor EM transmits torque to the differential mechanism DM for driving via the second input shaft S2→the gear G22→the gear G33→the output shaft S3→the gear G34→the gear G5, and the engine ICE transmits torque to the differential mechanism DM for driving via the first input shaft S1→the gear G12→the gear G31→the output shaft S3→the gear G34→the gear G5.

When the hybrid system is in the fifth hybrid driving mode Hybrid5, the electric motor EM and the engine ICE are both in the operating state; the first clutch unit K1 is engaged, and the second clutch unit K2 is disengaged; in the transmission DCT, the first synchromesh mechanism A1 is engaged with the gear G11, and the second synchromesh mechanism A2 is engaged with the gear G33.

Figure 4E:
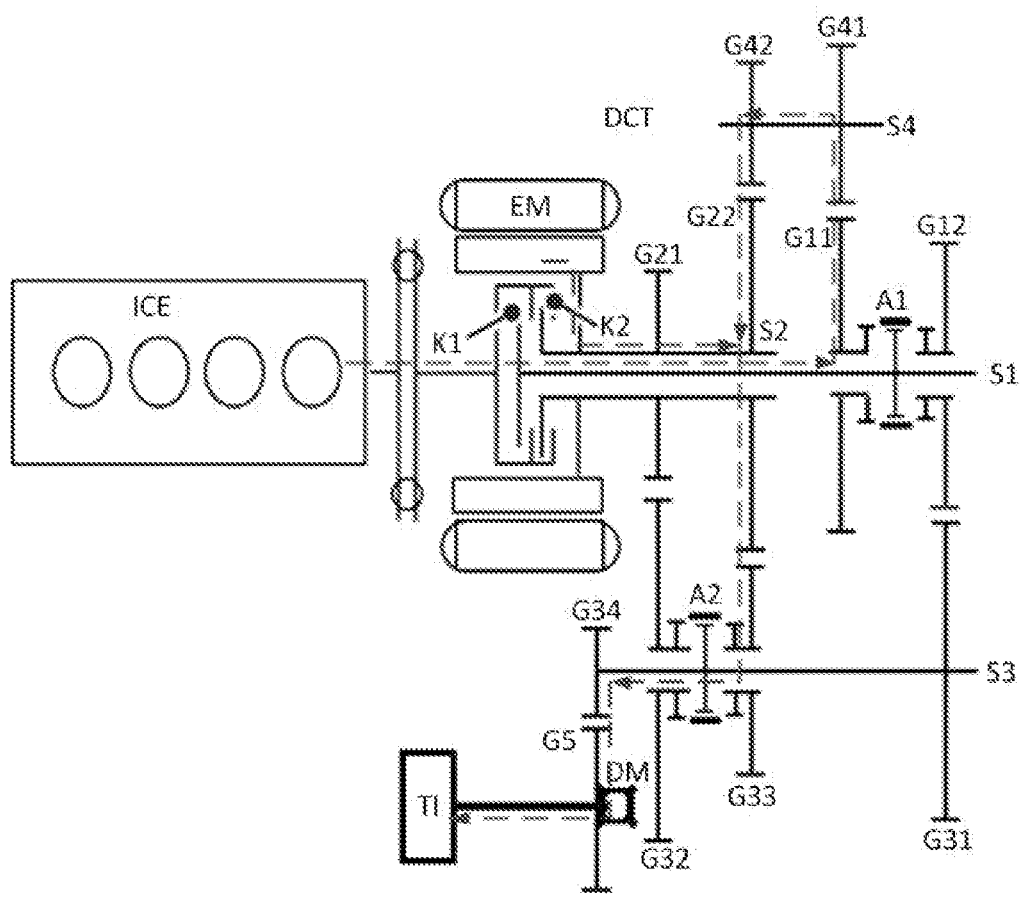
FIG. 4e is an illustrative diagram for illustrating the transmission path of torque of the engine and the electric motor in the transmission when the hybrid system in FIG. 1 is in a fifth hybrid driving mode.

Thus, as shown in FIG. 4e via broken lines, the electric motor EM transmits torque to the differential mechanism DM for driving via the second input shaft S2→the gear G22→the gear G33→the output shaft S3→the gear G34→the gear G5, and the engine ICE transmits torque to the differential mechanism DM for driving via the first input shaft S1→the gear G11→the gear G41→the intermediate shaft S4→the gear G42→the gear G22→the gear G33→the output shaft S3→the gear G34→the gear G5.

When the hybrid system is in the sixth hybrid driving mode Hybrid6, the electric motor EM and the engine ICE are both in the operating state; the first clutch unit K1 is disengaged, and the second clutch unit K2 is engaged; in the transmission DCT, the first synchromesh mechanism A1 is in the neutral state, and the second synchromesh mechanism A2 is engaged with the gear G33.

Figure 4F:
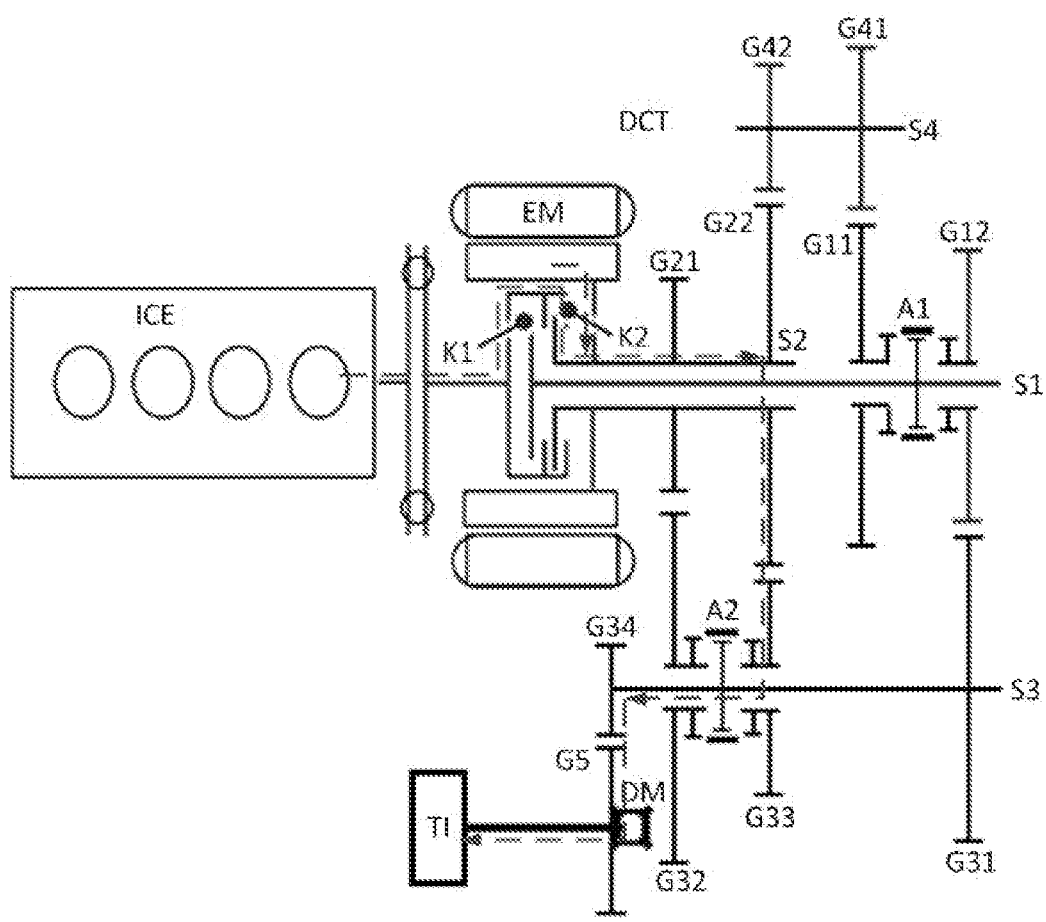
FIG. 4f is an illustrative diagram for illustrating a transmission path of torque of the engine and the electric motor in the transmission when the hybrid system in FIG. 1 is in a sixth hybrid driving mode.

Thus, as shown in FIG. 4f via broken lines, the electric motor EM transmits torque to the differential mechanism DM for driving via the second input shaft S2→the gear G22—the gear G33→the output shaft S3→the gear G34→the gear G5, and the engine ICE transmits torque to the differential mechanism DM for driving via the second input shaft S2→the gear G22→the gear G33→the output shaft S3→the gear G34→the gear G5.

Further, as shown in Table 1, the control module of the hybrid system can control the hybrid system such that the hybrid system implements the idle charge mode SC.

When the hybrid system is in the idle charge mode SC, the electric motor EM and the engine ICE are both in the operating state; the first clutch unit K1 is disengaged, and the second clutch unit K2 is engaged; in the transmission DCT, the first synchromesh mechanism A1 and the second synchromesh mechanism A2 are both in the neutral state.

Figure 5:
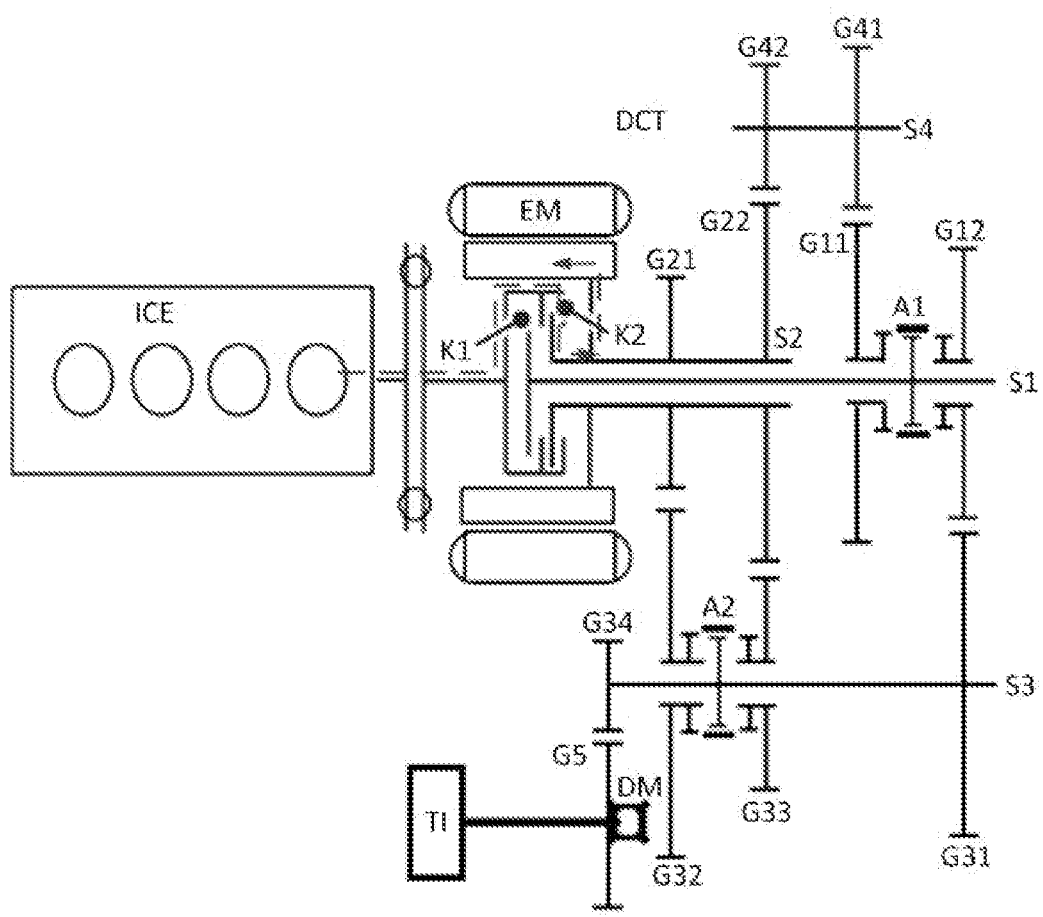
FIG. 5 is an illustrative diagram for illustrating a transmission path of torque of the engine in the transmission when the hybrid system in FIG. 1 is in an idle charge mode.

Thus, as shown in FIG. 5 via a broken line, the engine ICE transmits torque to the electric motor EM via the second input shaft S2 to enable the electric motor EM to charge the battery.

Further, as shown in Table 1, the control module of the hybrid system can control the hybrid system such that the hybrid system implements the two modes of starting the engine while driving ICE start1 and ICE start2.

When the hybrid system is in the first mode of starting the engine while driving ICE start1, the electric motor EM is in the operating state, and the engine ICE is to be started; the first clutch unit K1 is disengaged, and the second clutch unit K2 is engaged; in the transmission DCT, the first synchromesh mechanism A1 is in the neutral state, and the second synchromesh mechanism A2 is engaged with the gear G32.

Figure 6A:
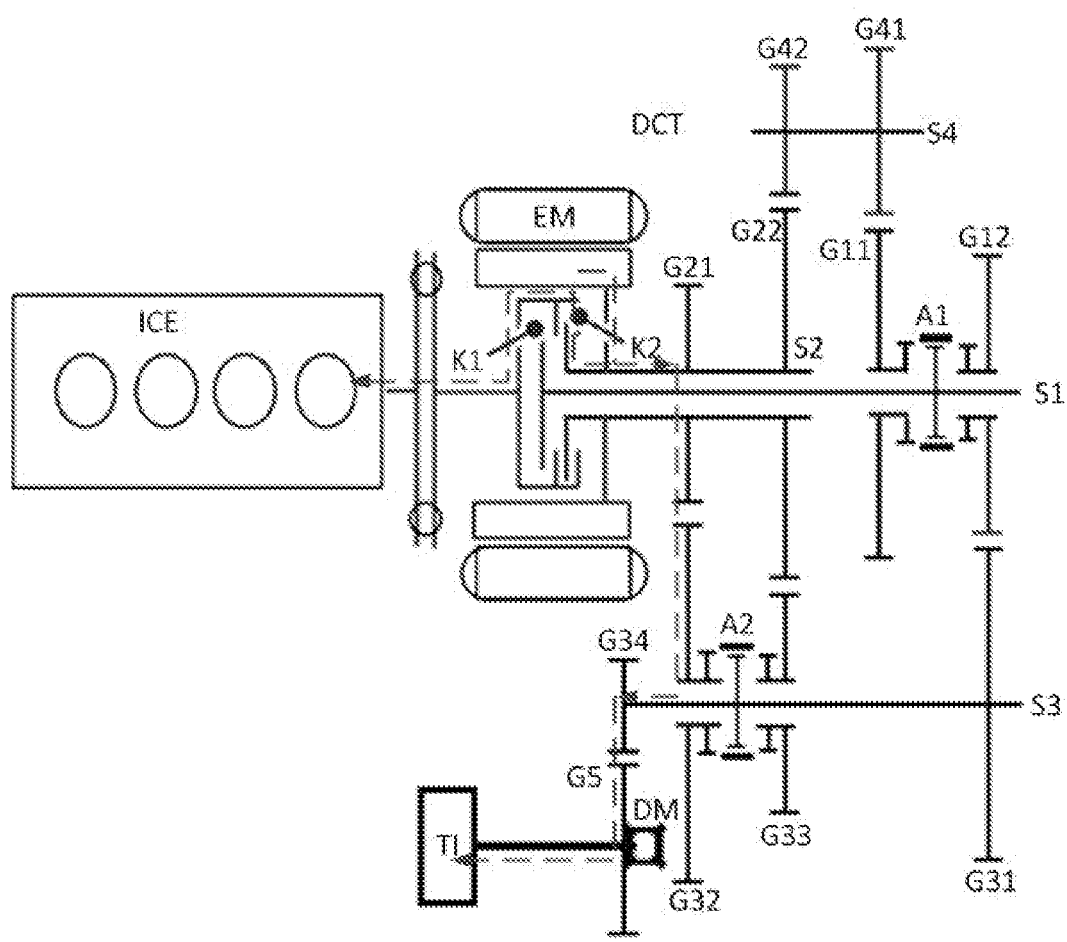
FIG. 6a is an illustrative diagram for illustrating a transmission path of torque of the electric motor in the transmission when the hybrid system in FIG. 1 is in a first mode of starting the engine while driving.

Thus, as shown in FIG. 6a via broken lines, the electric motor EM transmits torque to the differential mechanism DM for driving via the second input shaft S2→the gear G21→the gear G32→the output shaft S3→the gear G34→the gear G5, and the electric motor EM transmits torque to the engine ICE for starting the engine ICE via the second input shaft S2.

When the hybrid system is in the second mode of starting the engine while driving ICE start2, the electric motor EM is in the operating state, and the engine ICE is to be started; the first clutch unit K1 is disengaged, and the second clutch unit K2 is engaged; in the transmission DCT, the first synchromesh mechanism A1 is in the neutral state, and the second synchromesh mechanism A2 is engaged with the gear G33.

Figure 6B:
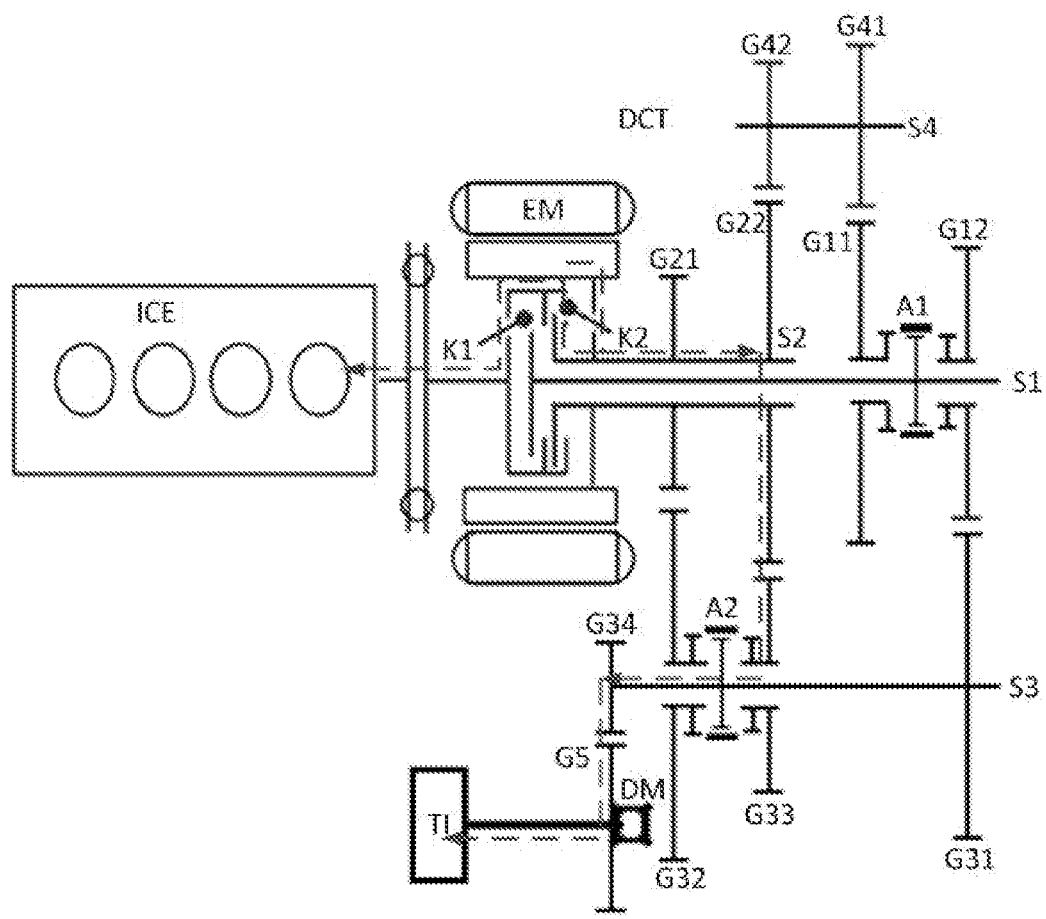
FIG. 6b is an illustrative diagram for illustrating a transmission path of torque of the electric motor in the transmission when the hybrid system in FIG. 1 is in a second mode of starting the engine while driving.

Thus, as shown in FIG. 6b via broken lines, the electric motor EM transmits torque to the differential mechanism DM for driving via the second input shaft S2→the gear G22→the gear G33→the output shaft S3→the gear G34→the gear G5, and the electric motor EM transmits torque to the engine ICE for starting the engine ICE via the second input shaft S2.

In addition, although not shown in Table 1, the hybrid system in FIG. 1 can also implement braking energy recovery, load point shifting and torque compensation during gear shifting.

The structure of the hybrid system according to other exemplary embodiments of the present disclosure illustrated in FIG. 7a to FIG. 7d differs from the structure of the hybrid system according to the exemplary embodiment of the present disclosure illustrated in FIG. 1 mainly in the manner in which the electric motor EM is in transmission connection with the second input shaft S2.

Figure 7A:
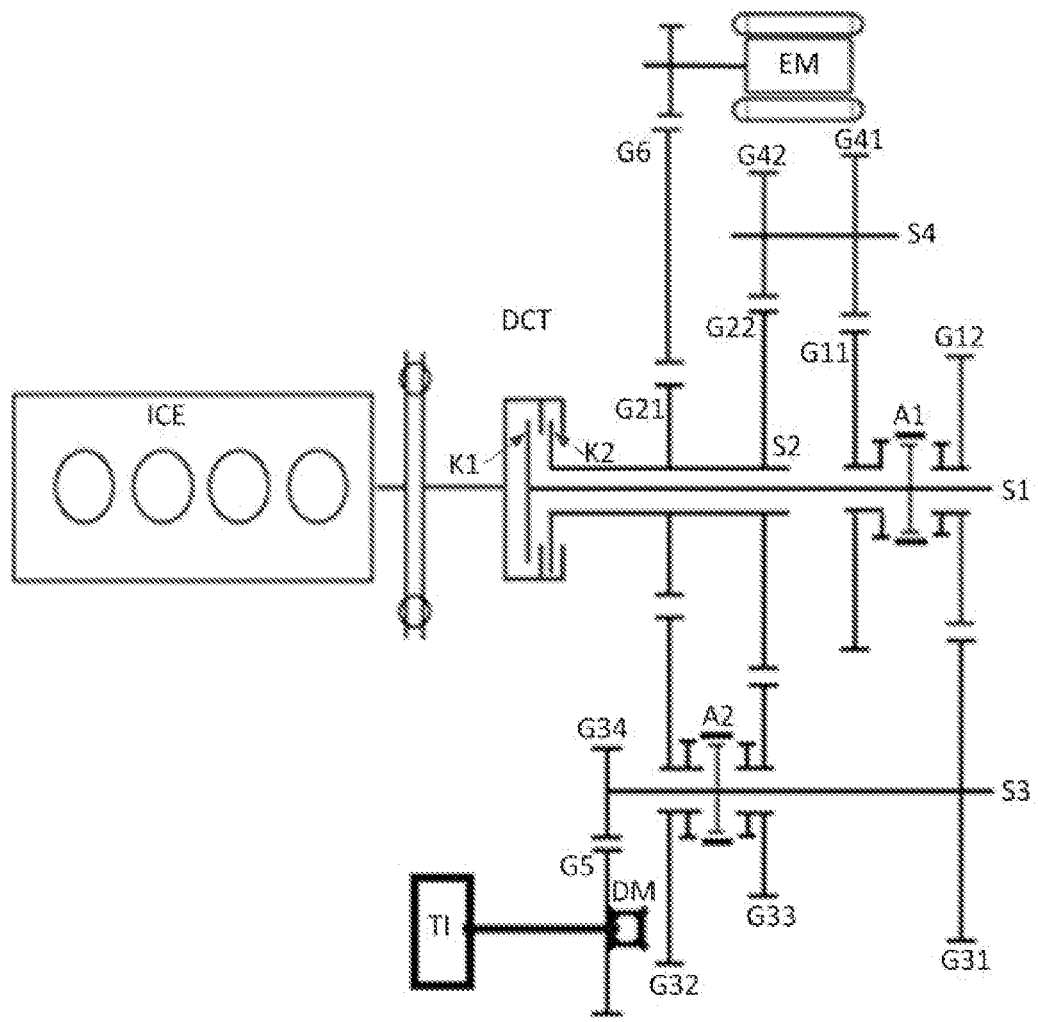
FIG. 7a to FIG. 7d are schematic diagrams of a connection structure of other exemplary embodiments of the hybrid system in FIG. 1.

As shown in FIG. 7a, the gear of the input/output shaft (rotor) of the electric motor EM is always in a meshing state with the gear G21 arranged on the second input shaft S2 in a torque-resistant manner via an additional intermediate gear G6, so the input/output shaft of the electric motor EM is always in transmission connection with the second input shaft S2.

Figure 7B:
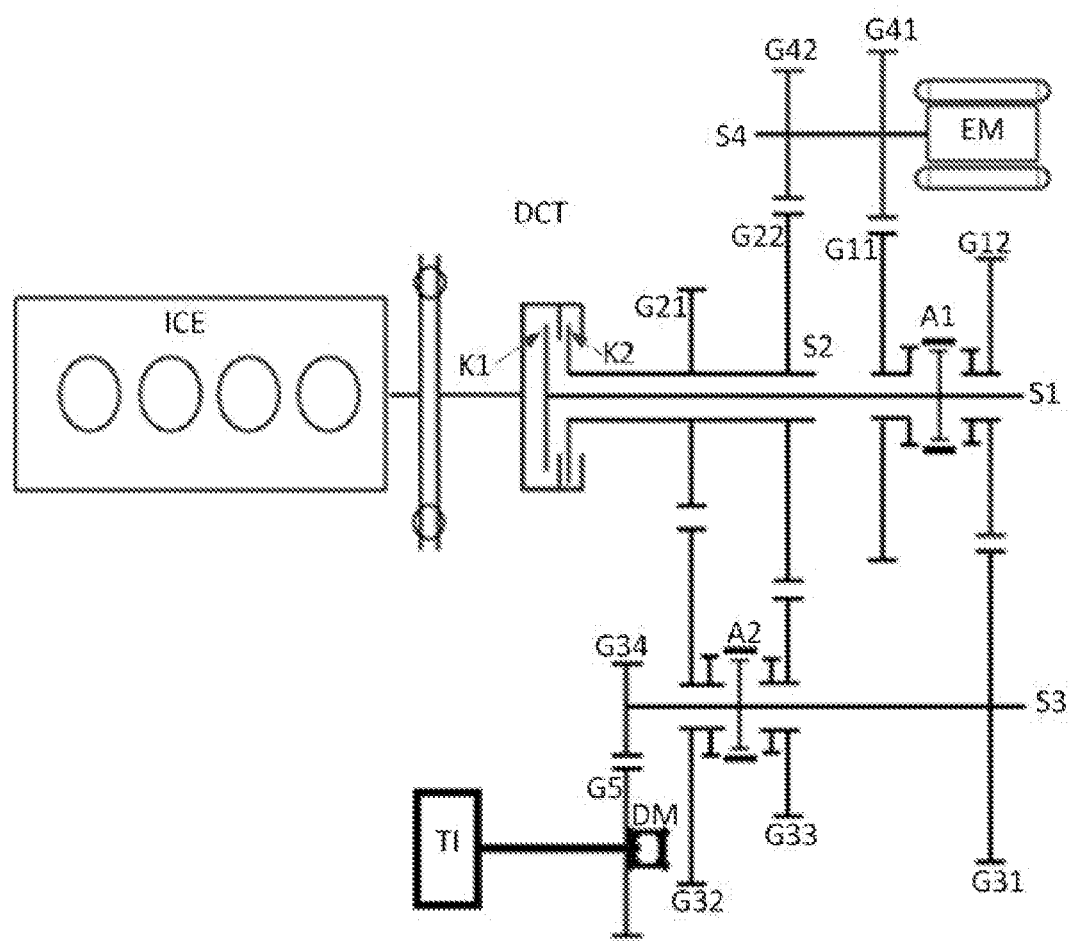

As shown in FIG. 7b, the input/output shaft (rotor) of the electric motor EM is directly connected with the intermediate shaft S4 in a coaxial manner, so the input/output shaft (rotor) of the electric motor EM is always in transmission connection with the second input shaft S2 via the gear G42 arranged on the intermediate shaft S4 in a torque-resistant manner and the gear G22 arranged on the second input shaft S2 in a torque-resistant manner.

Figure 7C:
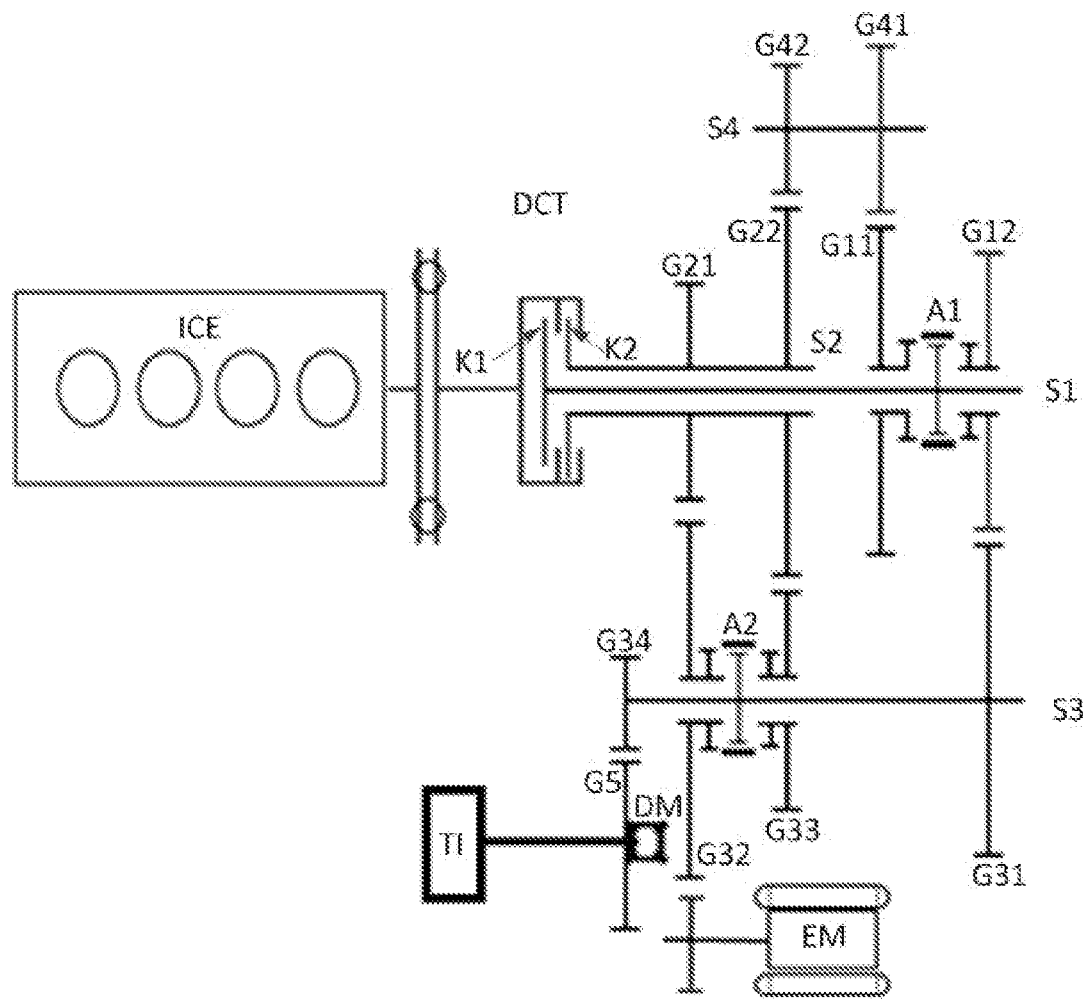

As shown in FIG. 7c, the gear of the input/output shaft (rotor) of the electric motor EM is always in a meshing state with the gear G32 arranged on the output shaft S3 in a non-torque-resistant manner, and the gear G32 is always in a meshing state with the gear G21 arranged on the second input shaft S2 in a torque-resistant manner, so the input/output shaft of the electric motor EM is always in transmission connection with the second input shaft S2.

Figure 7D:
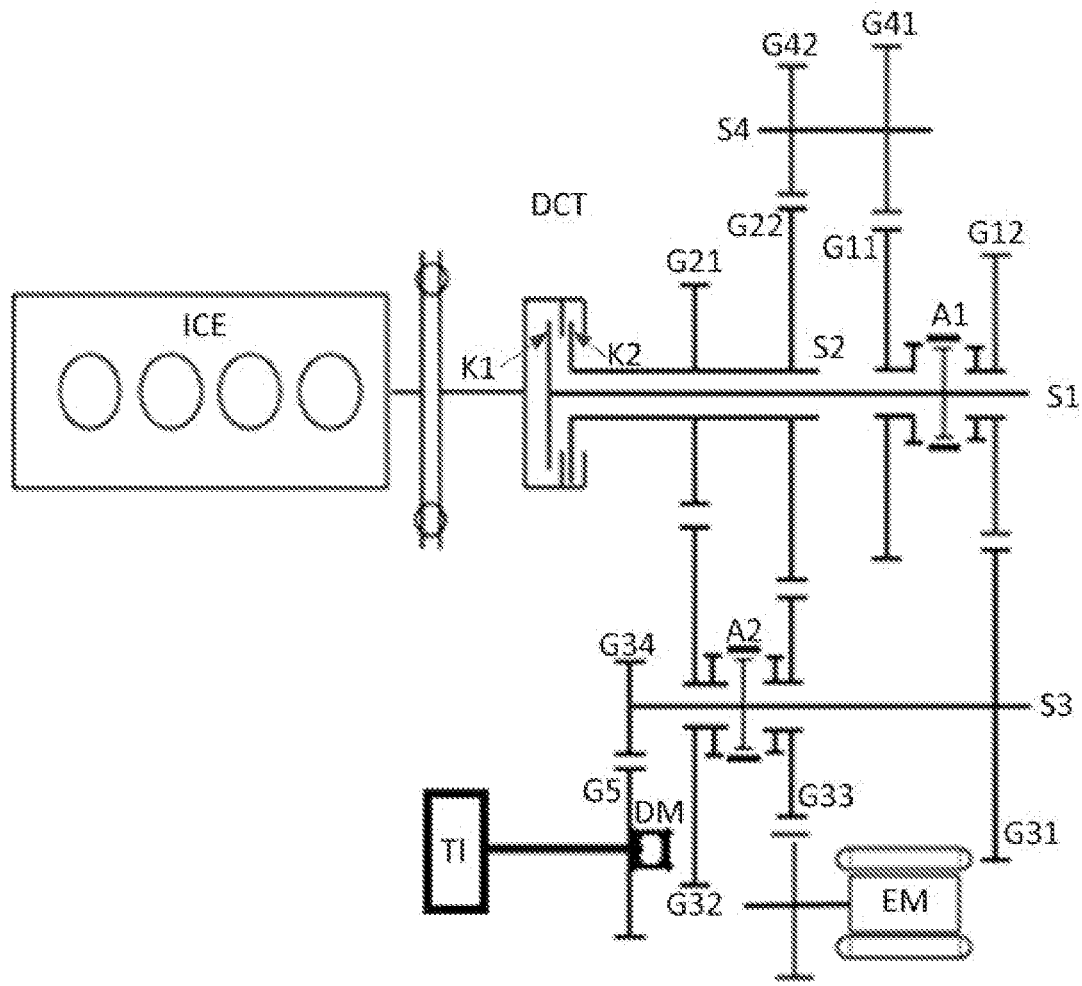

As shown in FIG. 7d, the gear of the input/output shaft (rotor) of the electric motor EM is always in a meshing state with the gear G33 arranged on the output shaft S3 in a non-torque-resistant manner, and the gear G33 is always in a meshing state with the gear G22 arranged on the second input shaft S2 in a torque-resistant manner, so the input/output shaft of the electric motor EM is always in transmission connection with the second input shaft S2.

In this way, the hybrid system according to the exemplary embodiments of the present disclosure illustrated in FIG. 7a to FIG. 7d is also capable of implementing various working modes described above and the beneficial effects of the present disclosure.

Specific embodiments of the present disclosure are described in detail above, but it should also be noted that the hybrid system according to the present disclosure can be modularly designed to implement a hybrid module, which may further comprise other components such as a module housing, a cooling jacket, an electric motor rotor support frame and bearings as required in addition to the components specified above.

Compared to the hybrid system comprising a transmission having five synchromesh mechanisms, a single clutch and a dual clutch described in the background art, though the transmission of the hybrid system according to the present disclosure comprises only two synchromesh mechanisms and a dual clutch, it is capable of implementing five pure engine driving modes and six hybrid driving modes. In contrast, the hybrid system according to the present disclosure has a simpler structure, a more compact size and a lower cost.

Compared to the hybrid system comprising a transmission having four synchromesh mechanisms and a gear reversing gear pair described in the background art, the transmission of the hybrid system according to the present disclosure comprises only two synchromesh mechanisms and has no dedicated gear reversing gear pair. In comparison, the hybrid system according to the present disclosure has a simpler structure, a more compact size and a lower cost.

Thus, the hybrid system according to the present disclosure is capable of employing a large engine, for example, a four-cylinder engine.

Compared to the structures of the existing hybrid systems described in the background art, the hybrid system according to the present disclosure, in addition to having a simpler structure, a more compact size and a lower cost, is also capable of always implementing gear shifting without torque interruption, thereby providing better driving performance; and the hybrid system is also capable of optimizing the operating state of the electric motor for different load configurations and starting the engine smoothly while the vehicle is driven purely by the electric motor to run.

The hybrid system according to the present disclosure can be applied as a strong hybrid system and a plug-in hybrid system, and can be used in various vehicle models.

In addition, in the technical solution of the specific embodiment above, the gear G11 may correspond to the first input shaft first gear, the gear G12 may correspond to the first input shaft second gear, the gear G21 may correspond to the second input shaft first gear, the gear G22 may correspond to the second input shaft second gear, the gear G31 may correspond to the output shaft first gear, the gear G32 may correspond to the output shaft second gear, the gear G33 may correspond to the output shaft third gear, the gear G34 may correspond to the output shaft fourth gear, the gear G41 may correspond to the intermediate shaft first gear, and the gear G42 may correspond to the intermediate shaft second gear.

LIST OF REFERENCE NUMERALS

ICE engine
K1 first clutch unit
K2 second clutch unit
EM electric motor
DCT transmission
S1 first input shaft
S2 second input shaft
S3 output shaft
S4 intermediate shaft
G11, G12, G21, G22, G31, G32, G33, G34, G41, G42, G5, G6 gear
A1 first synchromesh mechanism
A2 second synchromesh mechanism
DM differential mechanism
TI wheel.

The invention claimed is:

1. A hybrid system, comprising:
a transmission including a first input shaft, a second input shaft, an output shaft, and an intermediate shaft, wherein the second input shaft sleeves the first input shaft, and the second input shaft and the first input shaft are capable of rotating independently of each other, wherein the first input shaft is provided with a first synchromesh mechanism, and the output shaft is provided with a second synchromesh mechanism, wherein a first input shaft first gear, which is arranged on the first input shaft in a non-torque-resistant manner and corresponds to the first synchromesh mechanism, is always in a meshing state with an intermediate shaft first gear, which is arranged on the intermediate shaft in a torque-resistant manner, wherein a first input shaft second gear, which is arranged on the first input shaft in a non-torque-resistant manner and corresponds to the first synchromesh mechanism, is always in a meshing state with an output shaft first gear, which is arranged on the output shaft in a torque-resistant manner, wherein an output shaft second gear and an output shaft third gear, which are arranged on the output shaft in a non-torque-resistant manner and correspond to the second synchromesh mechanism, are always in a meshing state, respectively, with a second input shaft first gear and a second input shaft second gear, which are arranged on the second input shaft in a torque-resistant manner, wherein the intermediate shaft is also provided with an intermediate shaft second gear in a torque-resistant manner, and the intermediate shaft second gear is always in a meshing state with the second input shaft second gear;

an electric motor, wherein the electric motor is always in transmission connection with the second input shaft; and an engine and a dual clutch, wherein the dual clutch comprises a first clutch unit and a second clutch unit, the engine being selectively in transmission connection with the first input shaft via the first clutch unit and being selectively in transmission connection with the second input shaft via the second clutch unit.

2. The hybrid system according to claim 1, wherein the dual clutch is arranged on a radial inner side of a rotor of the electric motor.

3. The hybrid system according to claim 1, wherein one of:
a rotor of the electric motor is directly connected with the second input shaft in a coaxial manner; and
the electric motor is always in transmission connection with the second input shaft via one of the second input shaft first gear and the second input shaft second gear.

4. The hybrid system according to claim 3, wherein one of:
the rotor of the electric motor is directly connected with the intermediate shaft in a coaxial manner; and
the electric motor is always in transmission connection with the second input shaft via one of a first gear pair consisting of the output shaft second gear and the second input shaft first gear, a second gear pair consisting of the output shaft third gear and the second input shaft second gear, and a third gear pairing consisting of an additional intermediate gear and the second input shaft first gear.

5. The hybrid system according to claim 1, wherein the hybrid system is operable in one of a pure electric motor driving mode, a pure engine driving mode, and a hybrid driving mode, wherein:
in the pure electric motor driving mode, the engine is in a non-operating state, the electric motor is in an operating state, the first clutch unit and the second clutch unit are both disengaged, the first synchromesh mechanism is in a neutral state, and the second synchromesh mechanism is engaged with one of the output shaft second gear and the output shaft third gear, such that the electric motor transmits torque to the transmission for driving;
in the pure engine driving mode, the engine is in an operating state, the electric motor is in a non-operating state, one of the first clutch unit and the second clutch unit is engaged, and at least one of a) the first synchromesh mechanism is engaged with one of the first input shaft first gear and the first input shaft second gear, and b) the second synchromesh mechanism is engaged with one of the output shaft second gear and the output shaft third gear, such that the engine transmits torque to the transmission for driving; and
in the hybrid driving mode, the engine and the electric motor are both in an operating state, one of the first clutch unit and the second clutch unit is engaged, at least one of a) the first synchromesh mechanism is engaged with one of the first input shaft first gear and the first input shaft second gear, and b) the second synchromesh mechanism is engaged with one of a gear corresponding to the output shaft second gear and the output shaft third gear, such that the engine and the electric motor transmit torque to the transmission for driving.

6. The hybrid system according to claim 5, wherein, when the hybrid system is in the pure engine driving mode, one of:
the first clutch unit is engaged and the second clutch unit is disengaged, the first synchromesh mechanism is engaged with the first input shaft first gear, and the second synchromesh mechanism is engaged with one of the output shaft second gear and the output shaft third gear;
the first clutch unit is engaged and the second clutch unit is disengaged, the first synchromesh mechanism is engaged with the first input shaft second gear, and the second synchromesh mechanism is in a neutral state; and
the first clutch unit is disengaged and the second clutch unit is engaged, the first synchromesh mechanism is in a neutral state, and the second synchromesh mechanism is engaged with one of the output shaft second gear and the output shaft third gear.

7. The hybrid system according to claim 5, wherein, when the hybrid system is in the hybrid driving mode, one of:
the first clutch unit is engaged and the second clutch unit is disengaged, the first synchromesh mechanism is engaged with one of the first input shaft first gear and the first input shaft second gear, and the second synchromesh mechanism is engaged with one of the output shaft second gear or the output shaft third gear; and
the first clutch unit is disengaged and the second clutch unit is engaged, the first synchromesh mechanism is in a neutral state, and the second synchromesh mechanism is engaged with one of the output shaft second gear and the output shaft third gear.

8. The hybrid system according to claim 5, wherein the hybrid system is operable in an idle charge mode, in which the engine and the electric motor are both in an operating state, the first clutch unit is disengaged and the second clutch unit is engaged, both the first synchromesh mechanism and the second synchromesh mechanism are in a neutral state, such that the engine transmits torque to the electric motor to enable the electric motor to charge a battery.

9. The hybrid system according to claim 5, wherein the hybrid system is operable in a mode of starting the engine while driving in which the electric motor is in an operating state, the first clutch unit is disengaged and the second clutch unit is engaged, the first synchromesh mechanism is in a neutral state, and the second synchromesh mechanism is engaged with one of the output shaft second gear and the output shaft third gear, such that the electric motor transmits torque to the transmission while transmitting torque to the engine for starting the engine.

10. A vehicle, comprising the hybrid system according to claim 1.

11. A hybrid system, comprising:
a transmission including:
a first input shaft;
a first synchromesh mechanism arranged on the first input shaft;
a first input shaft first gear and a first input shaft second gear each arranged on the first input shaft in a non-torque resistant manner and corresponding to the first synchromesh mechanism;
a second input shaft arranged to sleeve the first input shaft, the first input shaft and the second input shaft being rotatably independently of each other;
a second input shaft first gear and a second input shaft second gear each arranged on the second input shaft in a torque-resistant manner;
an intermediate shaft;
an output shaft;
an intermediate shaft first gear and an intermediate shaft second gear each arranged on the intermediate shaft in a torque-resistant manner, wherein the first input shaft first gear is always in a meshing state with the intermediate shaft first gear, and the intermediate shaft second gear always in a meshing state with the second input shaft second gear;
an output shaft first gear arranged on the output shaft in a torque-resistant manner, wherein the first input shaft second gear always in a meshing state with the output shaft first gear;
a second synchromesh mechanism arranged on the output shaft; and
an output shaft second gear and an output shaft third gear each arranged on the output shaft in a non-torque-resistant manner and each corresponding to the second synchromesh mechanism, wherein the output shaft second gear and the output shaft third gear are always in a meshing state, respectively, with the second input shaft first gear and the second input shaft second gear;
an electric motor, wherein the electric motor is always in transmission connection with the second input shaft;
a differential mechanism, wherein the differential mechanism is always in transmission connection with the output shaft;
a dual clutch including a first clutch unit selectively engageable with the first input shaft and a second clutch unit selectively engageable with the second input shaft; and
an engine, the engine being selectively in transmission connection with the differential mechanism via one of the first clutch unit and the second clutch unit.

12. The hybrid system according to claim 11, wherein the engine is selectively in transmission connection with the electric motor via the second clutch unit.

13. The hybrid system according to claim 11, wherein one of:
a rotor of the electric motor is directly connected with the second input shaft in a coaxial manner; and
the electric motor is always in transmission connection with the second input shaft via one of the second input shaft first gear and the second input shaft second gear.

14. The hybrid system according to claim 13, wherein one of:
the rotor of the electric motor is directly connected with the intermediate shaft in a coaxial manner; and
the electric motor is always in transmission connection with the second input shaft via one of:
a first gear pair consisting of the output shaft second gear and the second input shaft first gear,
a second gear pair consisting of the output shaft third gear and the second input shaft second gear, and
a third gear pairing consisting of an additional intermediate gear and the second input shaft first gear.

15. The hybrid system according to claim 11, wherein the hybrid system is operable in one of a pure electric motor driving mode, a pure engine driving mode, and a hybrid driving mode, wherein:
in the pure electric motor driving mode, the engine is in a non-operating state, the electric motor is in an operating state, the first clutch unit and the second clutch unit are both disengaged, the first synchromesh mechanism is in a neutral state, and the second synchromesh mechanism is engaged with one of the output shaft second gear and the output shaft third gear, such that the electric motor transmits torque to the differential mechanism for driving;
in the pure engine driving mode, the engine is in an operating state, the electric motor is in a non-operating state, one of the first clutch unit and the second clutch unit is engaged, and at least one of a) the first synchromesh mechanism is engaged with one of the first input shaft first gear and the first input shaft second gear, and b) the second synchromesh mechanism is engaged with one of the output shaft second gear and the output shaft third gear, such that the engine transmits torque to the differential mechanism for driving; and
in the hybrid driving mode, the engine and the electric motor are both in an operating state, one of the first clutch unit and the second clutch unit is engaged, at least one of a) the first synchromesh mechanism is engaged with one of the first input shaft first gear and the first input shaft second gear, and b) the second synchromesh mechanism is engaged with one of a gear corresponding to the output shaft second gear and the output shaft third gear, such that the engine and the electric motor transmit torque to the differential mechanism for driving.

16. The hybrid system according to claim 15, wherein, when the hybrid system is in the pure engine driving mode, one of:
the first clutch unit is engaged and the second clutch unit is disengaged, the first synchromesh mechanism is engaged with the first input shaft first gear, and the second synchromesh mechanism is engaged with one of the output shaft second gear and the output shaft third gear;
the first clutch unit is engaged and the second clutch unit is disengaged, the first synchromesh mechanism is engaged with the first input shaft second gear, and the second synchromesh mechanism is in a neutral state; and
the first clutch unit is disengaged and the second clutch unit is engaged, the first synchromesh mechanism is in a neutral state, and the second synchromesh mechanism is engaged with one of the output shaft second gear and the output shaft third gear.

17. The hybrid system according to claim 15, wherein, when the hybrid system is in the hybrid driving mode, one of:
the first clutch unit is engaged and the second clutch unit is disengaged, the first synchromesh mechanism is engaged with one of the first input shaft first gear and the first input shaft second gear, and the second synchromesh mechanism is engaged with one of the output shaft second gear or the output shaft third gear; and
the first clutch unit is disengaged and the second clutch unit is engaged, the first synchromesh mechanism is in a neutral state, and the second synchromesh mechanism is engaged with one of the output shaft second gear and the output shaft third gear.

18. The hybrid system according to claim 15, wherein the hybrid system is operable in an idle charge mode, in which the engine and the electric motor are both in an operating state, the first clutch unit is disengaged and the second clutch unit is engaged, both the first synchromesh mechanism and the second synchromesh mechanism are in a neutral state, such that the engine transmits torque to the electric motor to enable the electric motor to charge a battery.

19. The hybrid system according to claim 15, wherein the hybrid system is operable in a mode of starting the engine while driving in which the electric motor is in an operating state, the first clutch unit is disengaged and the second clutch unit is engaged, the first synchromesh mechanism is in a neutral state, and the second synchromesh mechanism is engaged with one of the output shaft second gear and the output shaft third gear, such that the electric motor transmits torque to the differential mechanism while transmitting torque to the engine for starting the engine.

20. A vehicle, comprising the hybrid system according to claim 11.

\* \* \* \* \*